(12) United States Patent
Doh

(10) Patent No.: US 10,602,115 B2
(45) Date of Patent: Mar. 24, 2020

(54) METHOD AND APPARATUS FOR GENERATING PROJECTION IMAGE, METHOD FOR MAPPING BETWEEN IMAGE PIXEL AND DEPTH VALUE

(71) Applicant: Korea University Research and Business Foundation, Seoul (KR)

(72) Inventor: Nak Ju Doh, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 30 days.

(21) Appl. No.: 15/515,315

(22) PCT Filed: Jun. 29, 2016

(86) PCT No.: PCT/KR2016/006961
§ 371 (c)(1),
(2) Date: Mar. 29, 2017

(87) PCT Pub. No.: WO2017/007166
PCT Pub. Date: Jan. 12, 2017

(65) Prior Publication Data
US 2017/0230633 A1    Aug. 10, 2017

(30) Foreign Application Priority Data

Jul. 8, 2015   (KR) .................. 10-2015-0097442
May 9, 2016   (KR) .................. 10-2016-0056447

(51) Int. Cl.
*H04N 13/117*   (2018.01)
*H04N 13/122*   (2018.01)
(Continued)

(52) U.S. Cl.
CPC ............. *H04N 13/117* (2018.05); *G06F 3/01* (2013.01); *G06F 3/0346* (2013.01);
(Continued)

(58) Field of Classification Search
CPC .. H04N 13/117; H04N 13/383; H04N 13/271; H04N 13/344; H04N 13/361;
(Continued)

(56) References Cited

U.S. PATENT DOCUMENTS

2012/0235988 A1*   9/2012   Karafin ............... H04N 13/261
                                                          345/419
2013/0044108 A1*   2/2013   Tanaka .................... G06T 15/04
                                                          345/419

(Continued)

FOREIGN PATENT DOCUMENTS

KR    20080085655 A    9/2008
KR    20140000315 A    1/2014
KR    20140001167 A    1/2014

OTHER PUBLICATIONS

Yeon et al., "Observability Analysis of 2D Geometric Features using the Condition Number for SLAM Applications," 13th International Conference on Control, Automation and Systems (ICCAS 2013); pp. 1540-1543.

*Primary Examiner* — Joseph G Ustaris
*Assistant Examiner* — Matthew David Kim
(74) *Attorney, Agent, or Firm* — Fox Rothschild LLP

(57) ABSTRACT

Disclosed is a projection image generating method for a 3D space. An exemplary embodiment of the present disclosure provides a projection image generating method, including: estimating a plurality of image obtaining poses and a plurality of depth obtaining poses including obtaining positions and obtaining angles of a plurality of obtained images and a plurality of obtained depth values obtained in an actual 3D space, respectively, with respect to a reference coordinate system; obtaining a user pose including a location and an angle of the user in a virtual 3D space corresponding to the actual 3D space with respect to the reference coordinate system; and generating a projection image obtained by (Continued)

projecting the plurality of obtained depth values into at least one of the plurality of obtained images, based on the corresponding image obtaining pose corresponding to the user pose and at least one corresponding depth obtaining pose.

16 Claims, 19 Drawing Sheets

(51) Int. Cl.

| | |
|---|---|
| *H04N 13/361* | (2018.01) |
| *H04N 13/383* | (2018.01) |
| *G06T 7/579* | (2017.01) |
| *G06F 3/01* | (2006.01) |
| *G06F 3/0481* | (2013.01) |
| *G06T 3/00* | (2006.01) |
| *G06T 7/00* | (2017.01) |
| *G06T 17/05* | (2011.01) |
| *G06T 17/20* | (2006.01) |
| *G06T 19/00* | (2011.01) |
| *G06F 3/0346* | (2013.01) |
| *H04N 13/344* | (2018.01) |
| *H04N 13/282* | (2018.01) |
| *H04N 13/271* | (2018.01) |
| *G06T 7/73* | (2017.01) |
| *H04N 5/232* | (2006.01) |
| *H04N 13/00* | (2018.01) |

(52) U.S. Cl.
CPC .............. *G06F 3/0481* (2013.01); *G06T 3/00* (2013.01); *G06T 7/00* (2013.01); *G06T 7/579* (2017.01); *G06T 7/74* (2017.01); *G06T 17/05* (2013.01); *G06T 17/20* (2013.01); *G06T 19/00* (2013.01); *H04N 13/122* (2018.05); *H04N 13/271* (2018.05); *H04N 13/282* (2018.05); *H04N 13/344* (2018.05); *H04N 13/361* (2018.05); *H04N 13/383* (2018.05); *G06T 2207/10012* (2013.01); *G06T 2207/10028* (2013.01); *G06T 2207/20076* (2013.01); *G06T 2207/30201* (2013.01); *G06T 2207/30244* (2013.01); *H04N 5/23238* (2013.01); *H04N 2013/0081* (2013.01); *H04N 2013/0096* (2013.01)

(58) Field of Classification Search
CPC .... H04N 13/122; H04N 13/282; G06T 7/579; G06T 7/74
USPC .......................................................... 348/51
See application file for complete search history.

(56) References Cited

U.S. PATENT DOCUMENTS

| | | | | |
|---|---|---|---|---|
| 2013/0100132 | A1* | 4/2013 | Katayama | H04N 13/275 345/420 |
| 2013/0108116 | A1* | 5/2013 | Suzuki | G01B 11/002 382/106 |
| 2013/0135315 | A1* | 5/2013 | Bares | G06T 13/20 345/473 |
| 2013/0321590 | A1* | 12/2013 | Kirk | G06T 15/04 348/48 |
| 2014/0098100 | A1* | 4/2014 | Dane | G06T 15/20 345/427 |
| 2014/0118339 | A1* | 5/2014 | Davies | G06T 3/60 345/419 |
| 2015/0145985 | A1 | 5/2015 | Gourlay et al. | |
| 2015/0249815 | A1* | 9/2015 | Sandrew | G06T 15/205 348/47 |
| 2016/0019718 | A1* | 1/2016 | Mukkamala | G06F 3/011 345/419 |
| 2016/0210785 | A1* | 7/2016 | Balachandreswaran | G02B 27/017 |
| 2018/0133593 | A1* | 5/2018 | Wilson | G06T 15/00 |

* cited by examiner

[Figure 1]
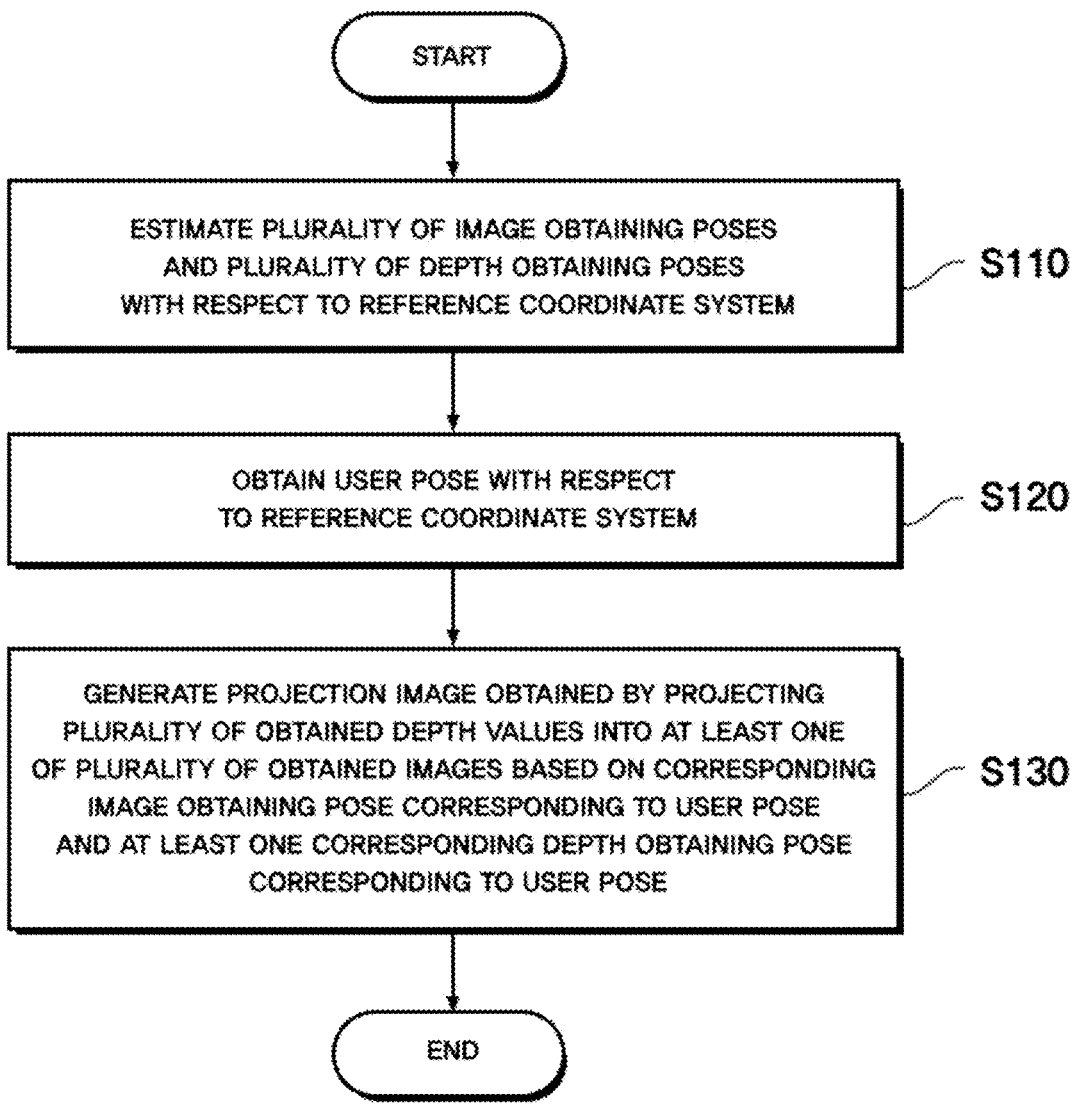

[Figure 2]
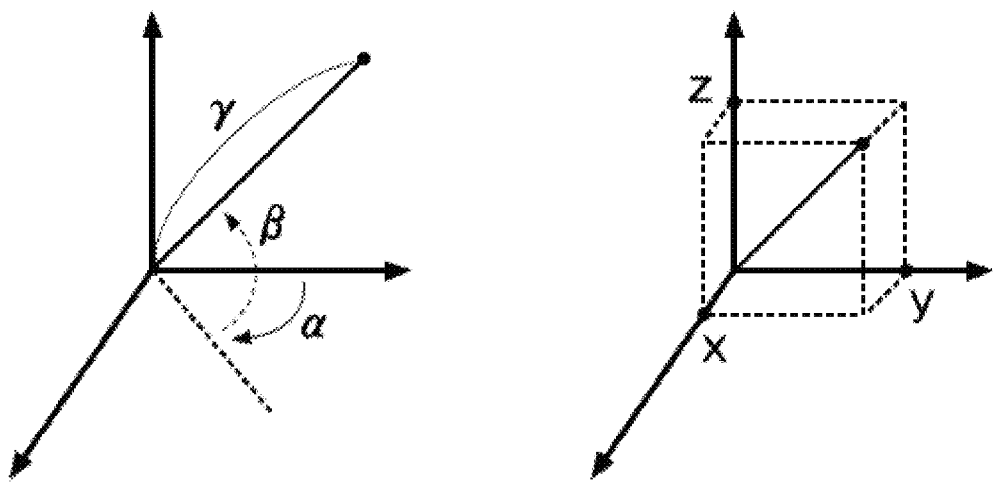
[Figure 3]
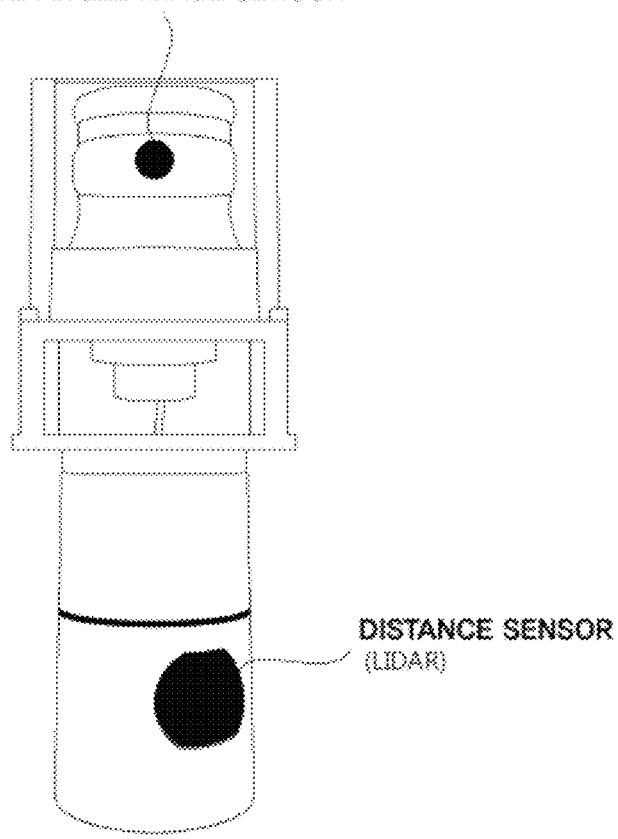

[Figure 4]
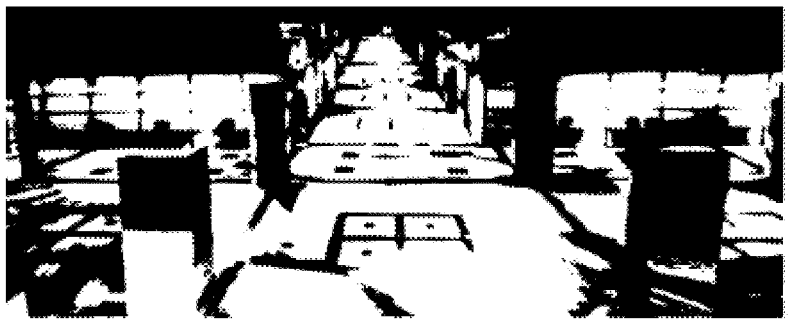
[Figure 5]
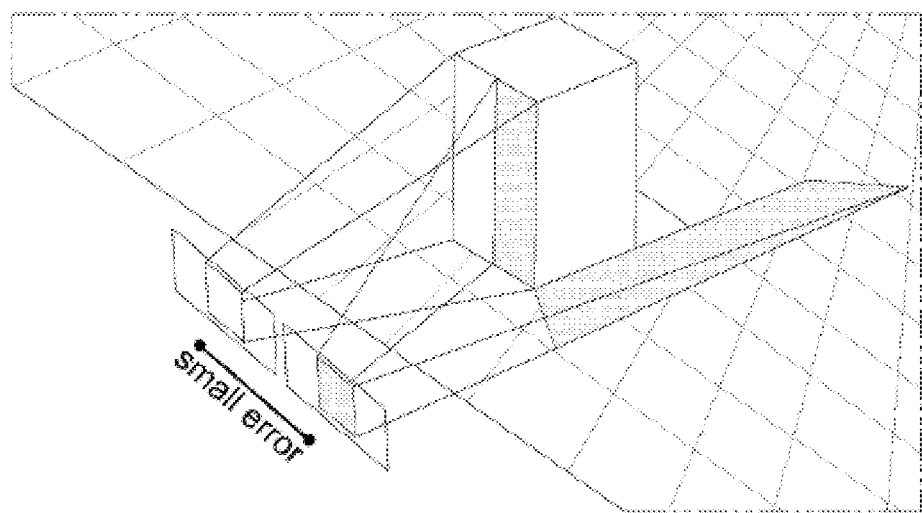
[Figure 6a]
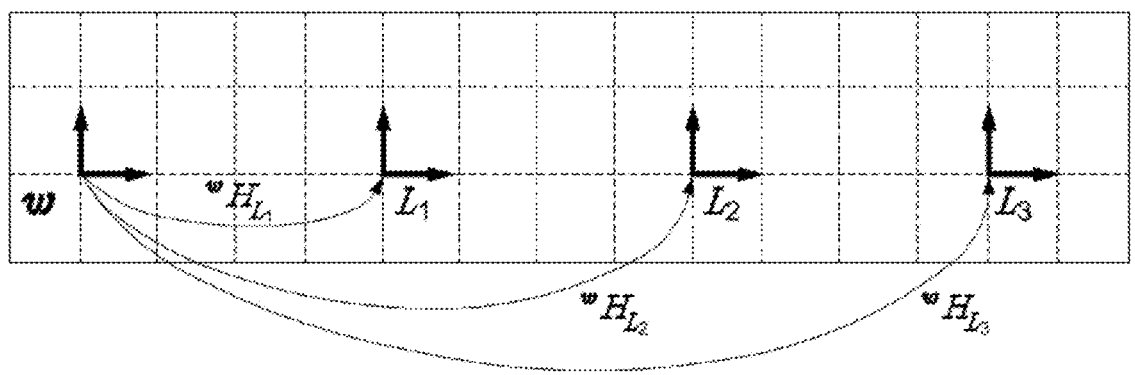

[Figure 6b]
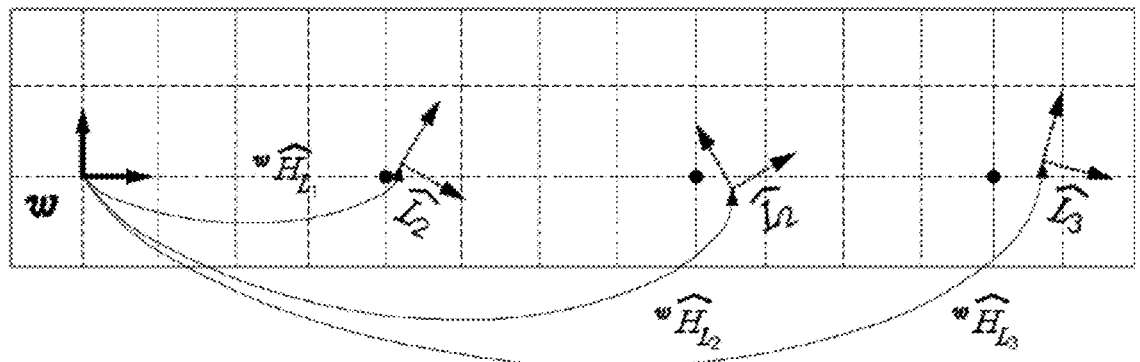
[Figure 7a]
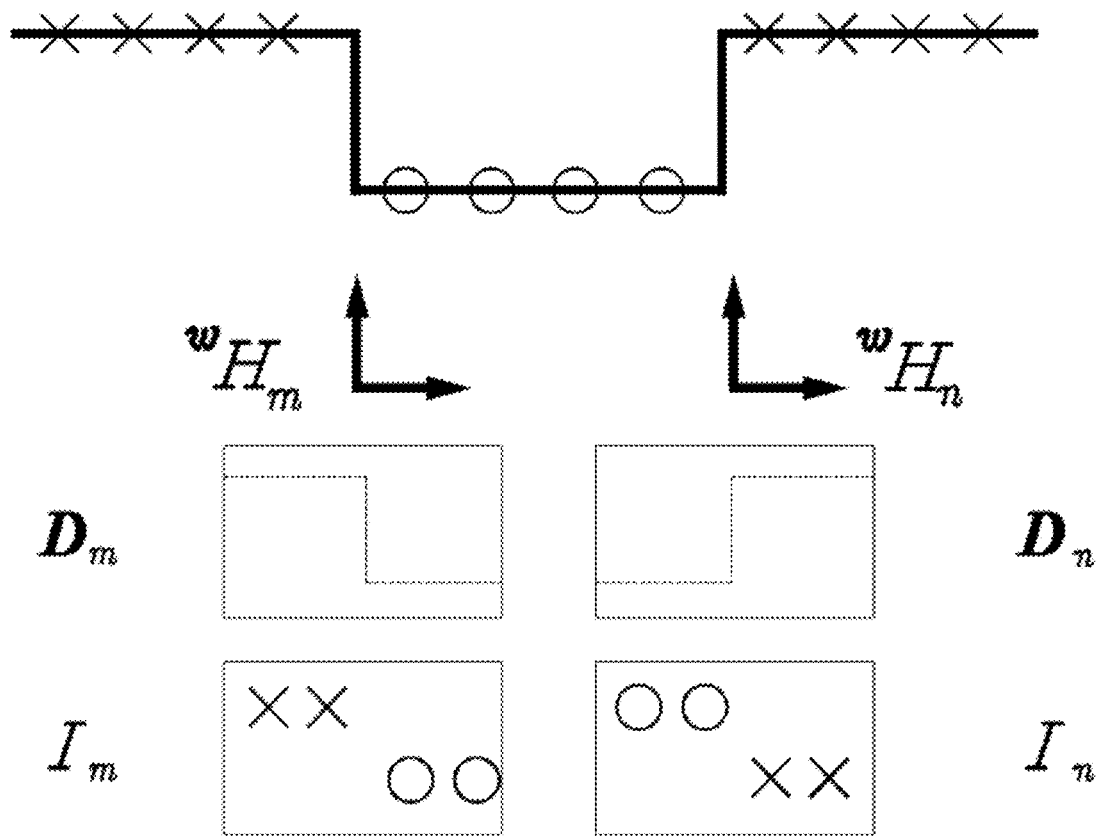

[Figure 7b]
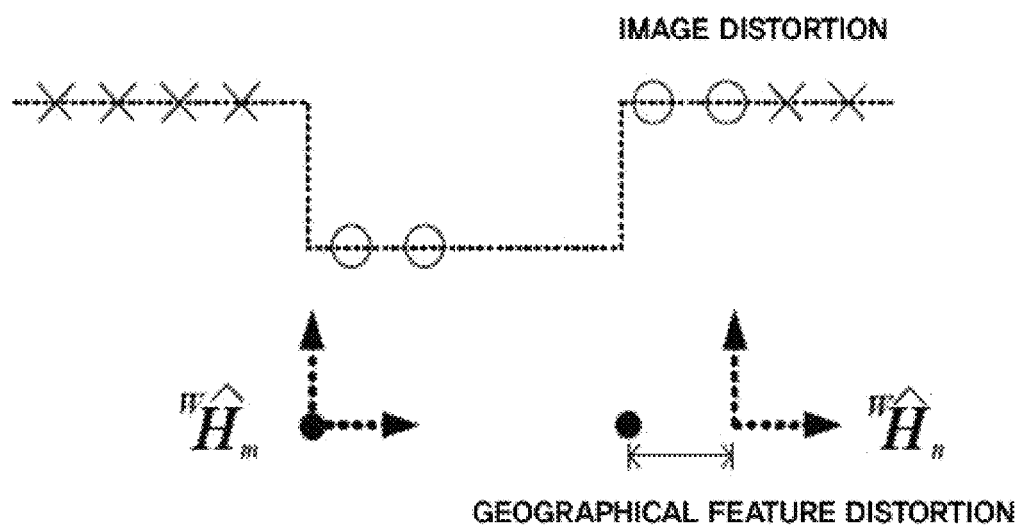
[Figure 8]
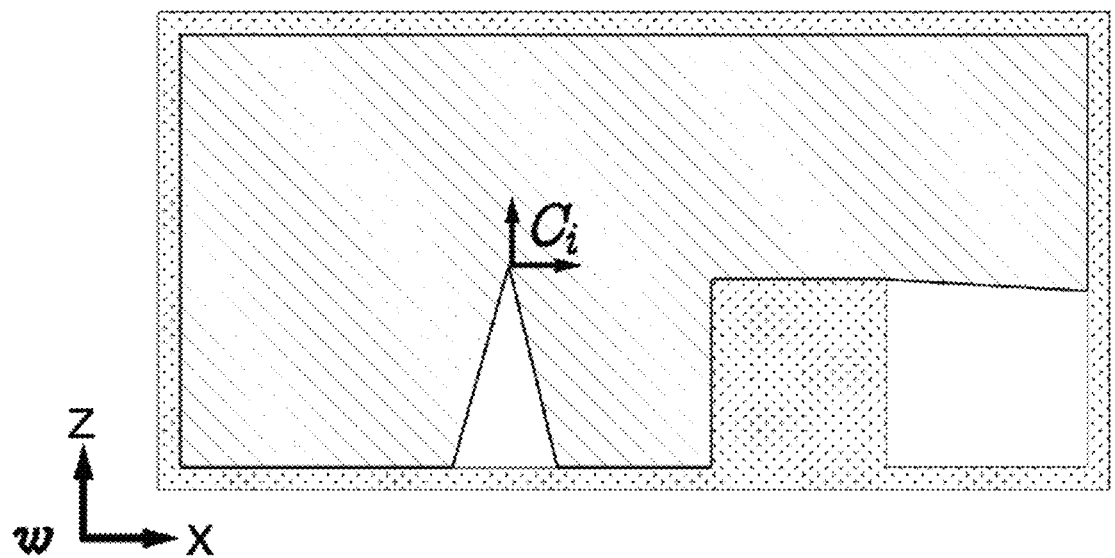

[Figure 9]
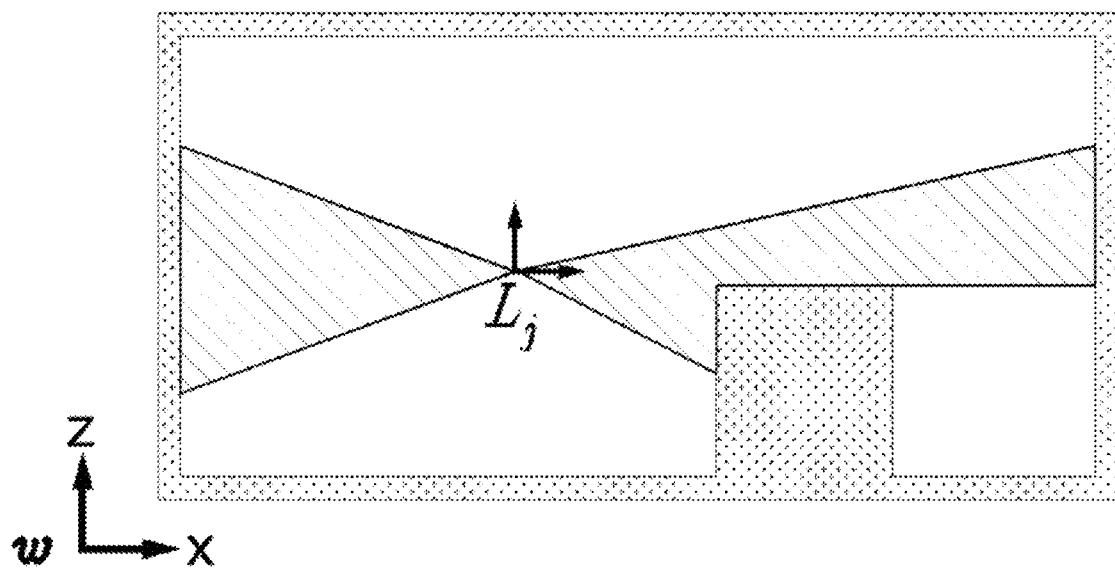
[Figure 10]
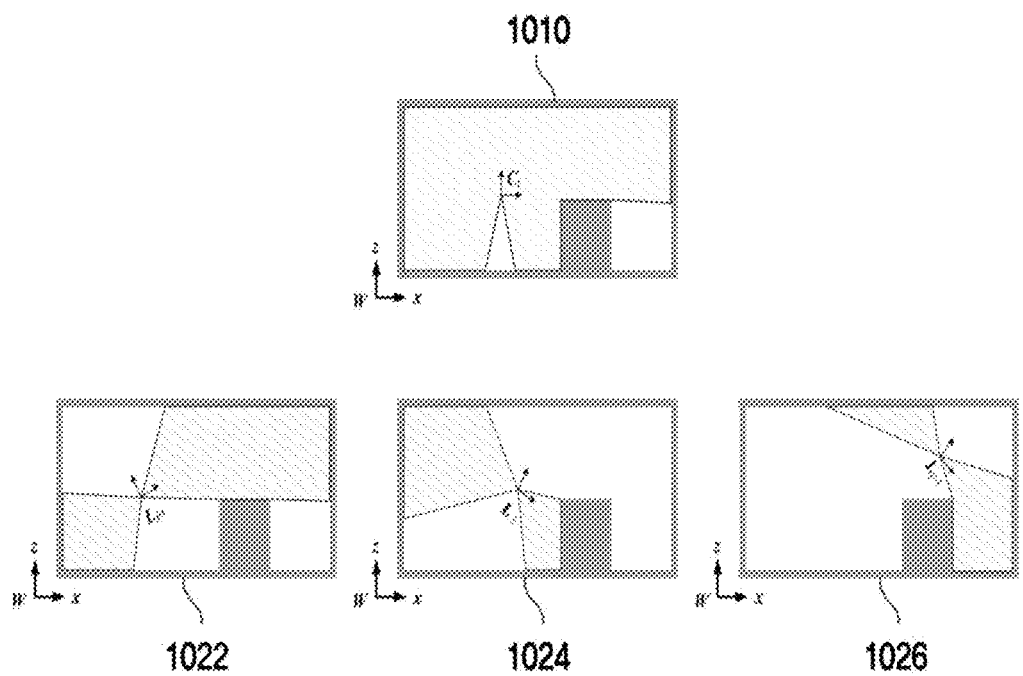
1022  1024  1026

[Figure 11]
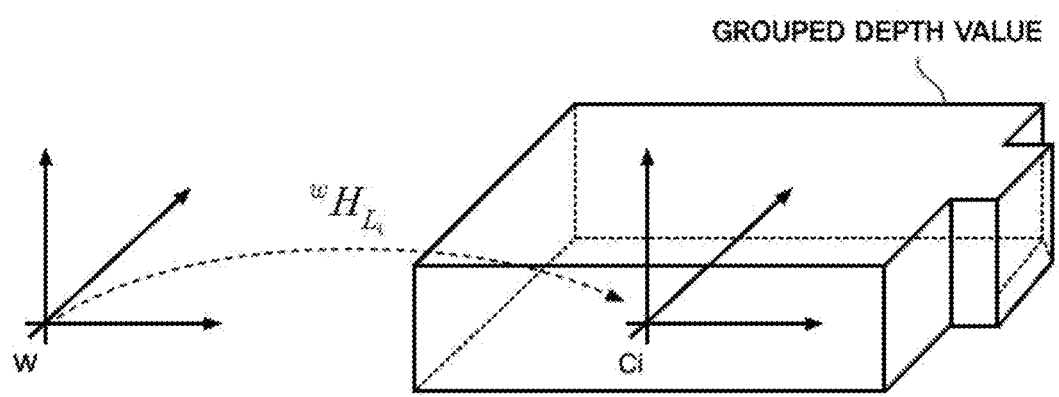
[Figure 12]
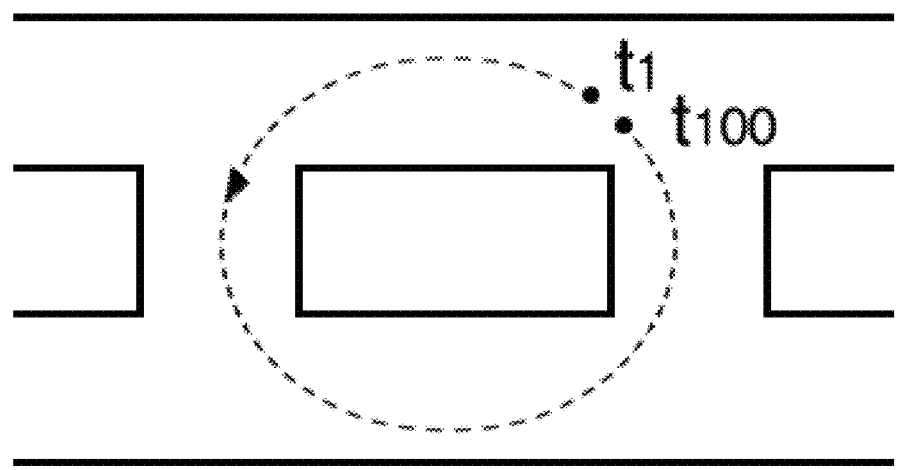

[Figure 13]
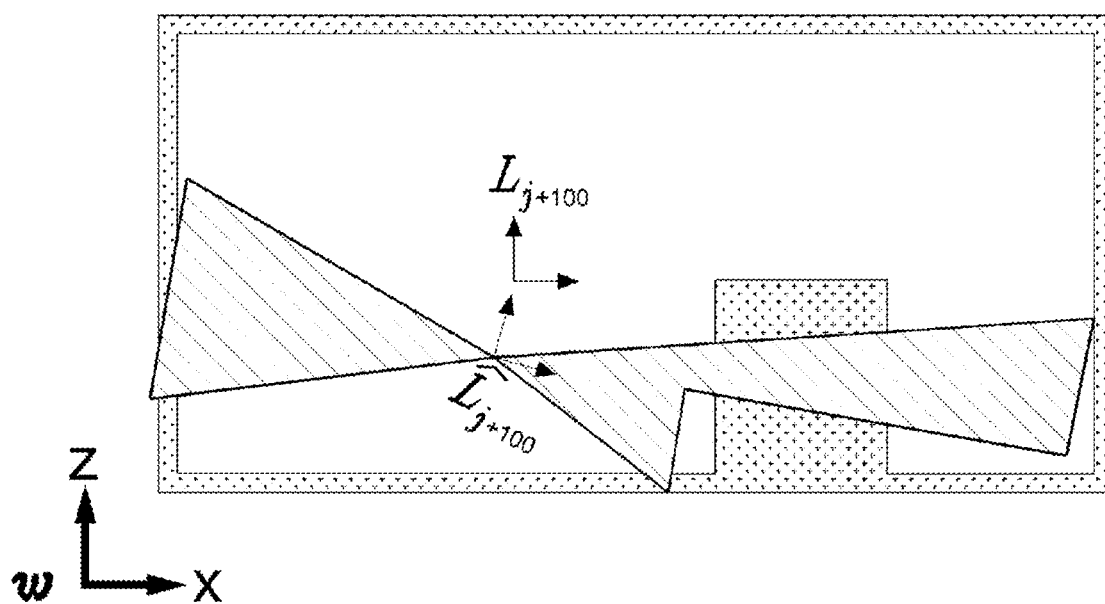

[Figure 14]
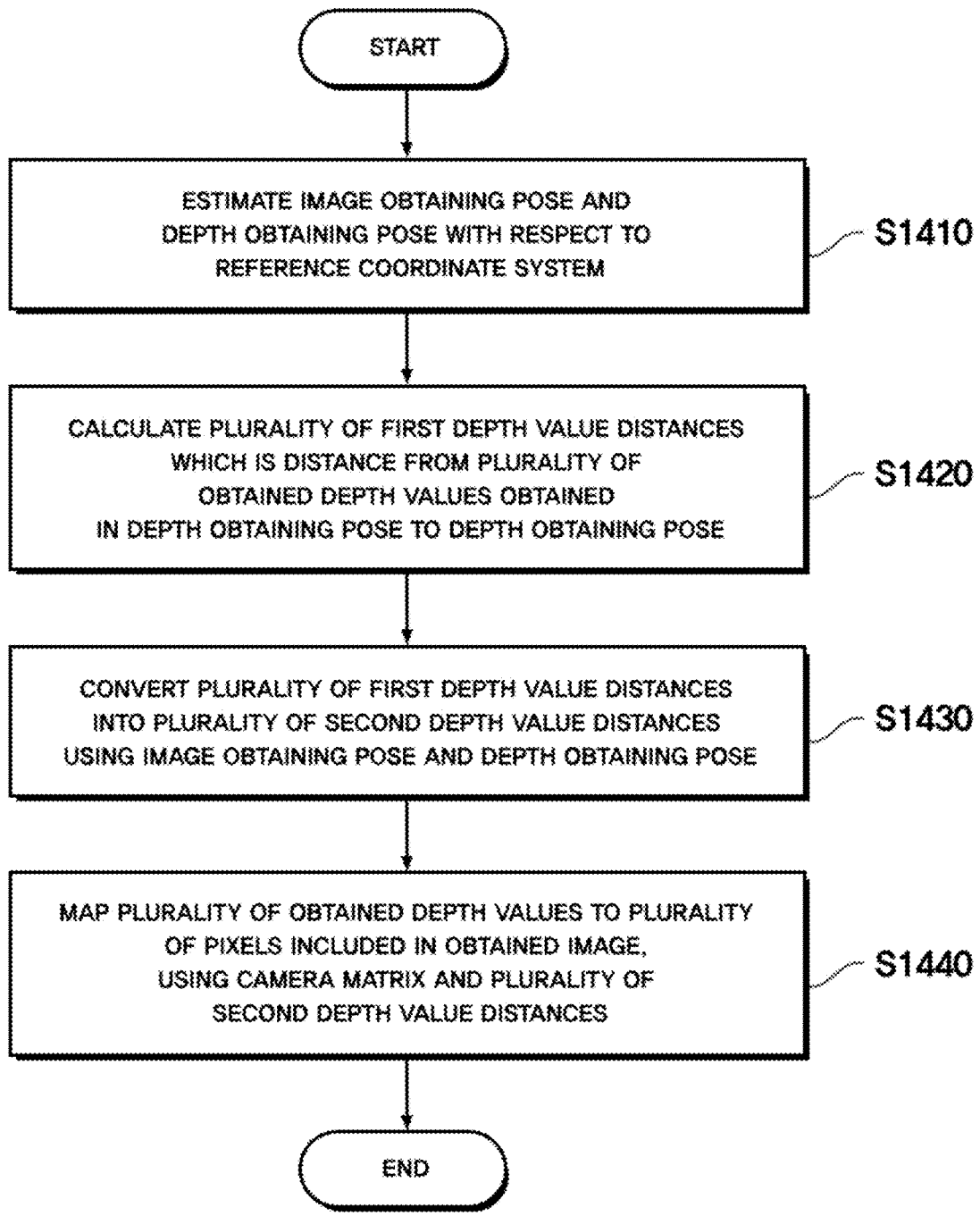

[Figure 15a]
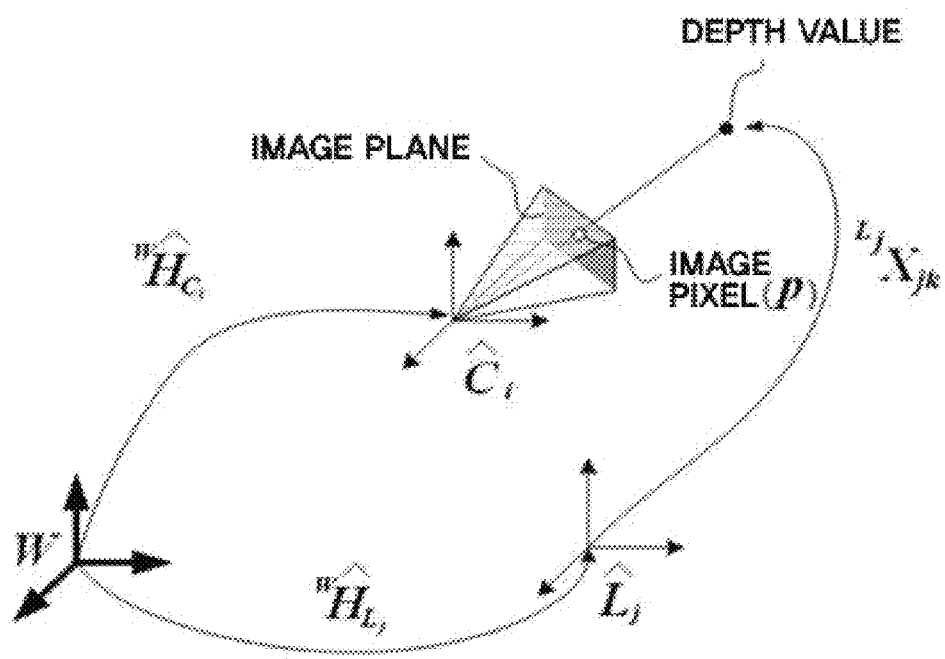
[Figure 15b]
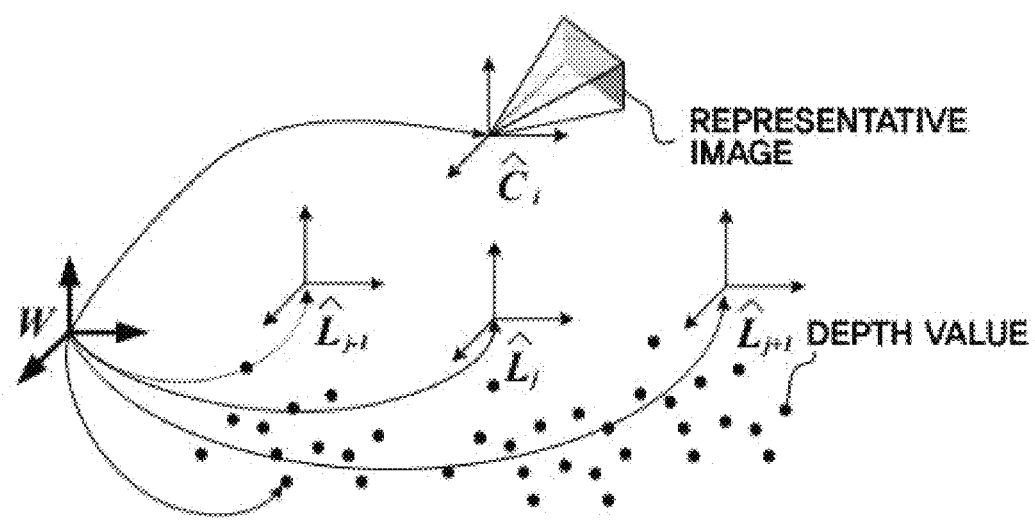

[Figure 15c]
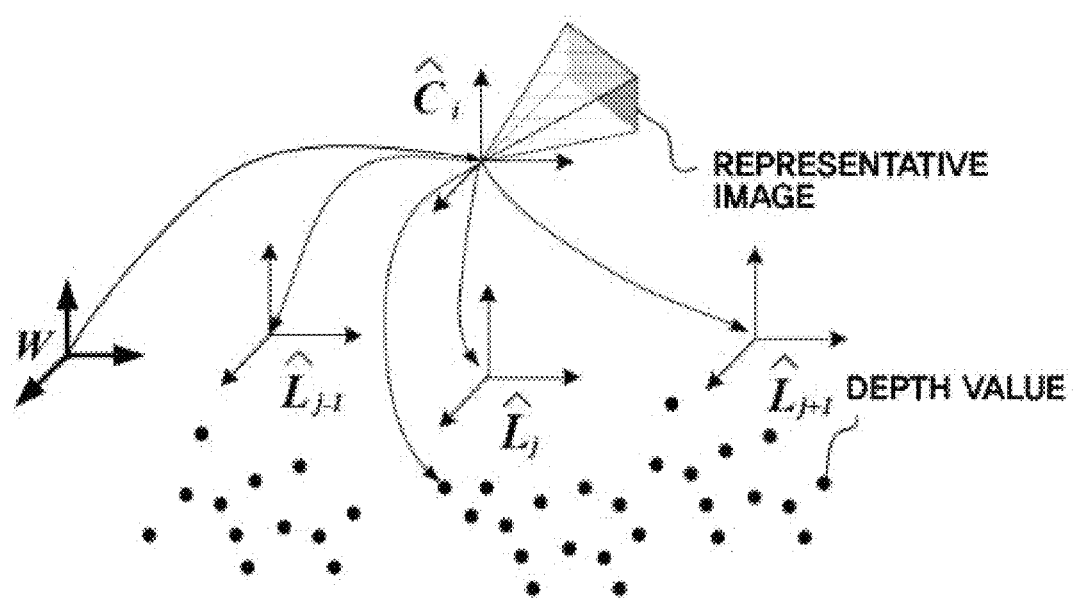

[Figure 16]
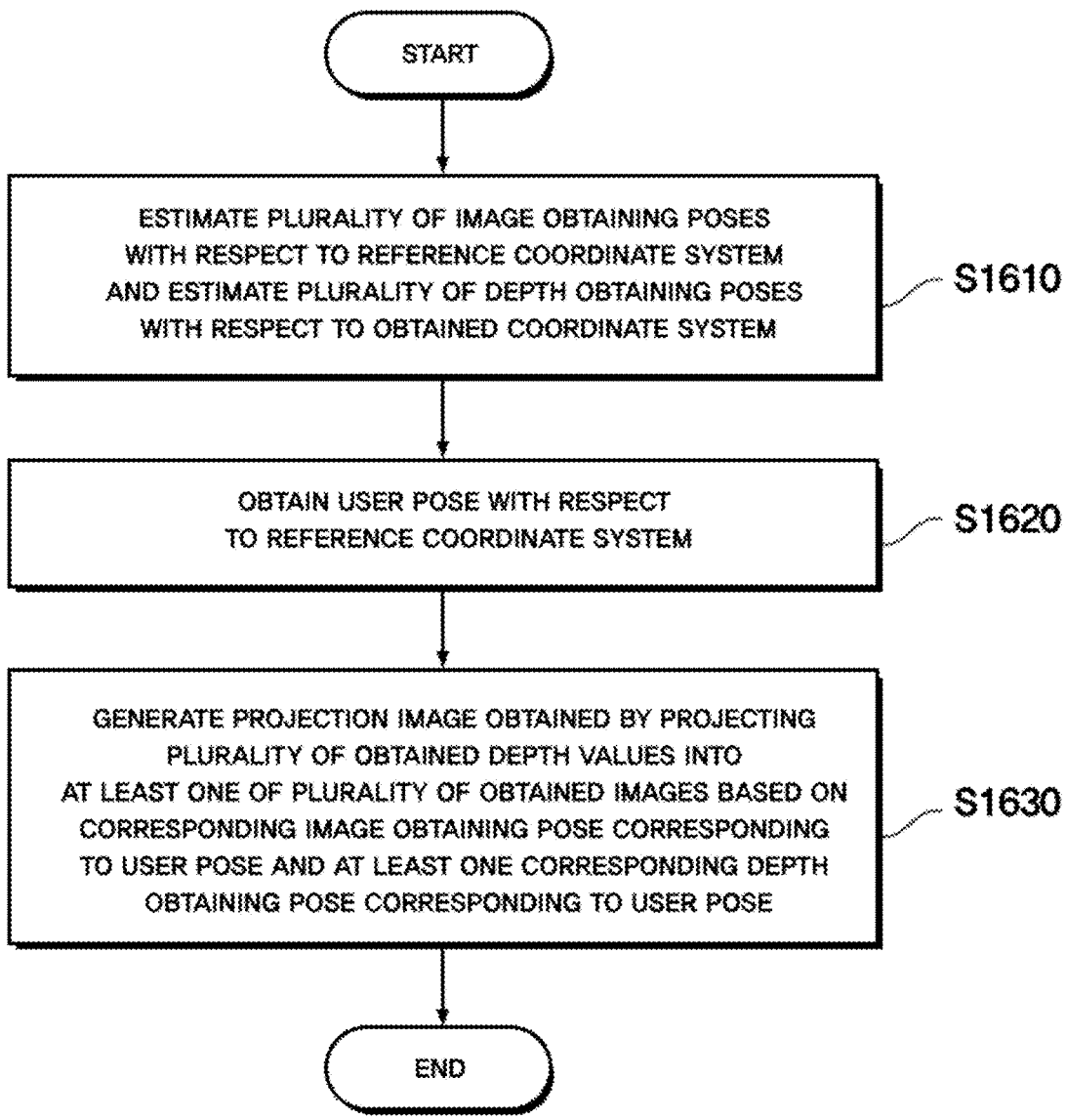

[Figure 17]
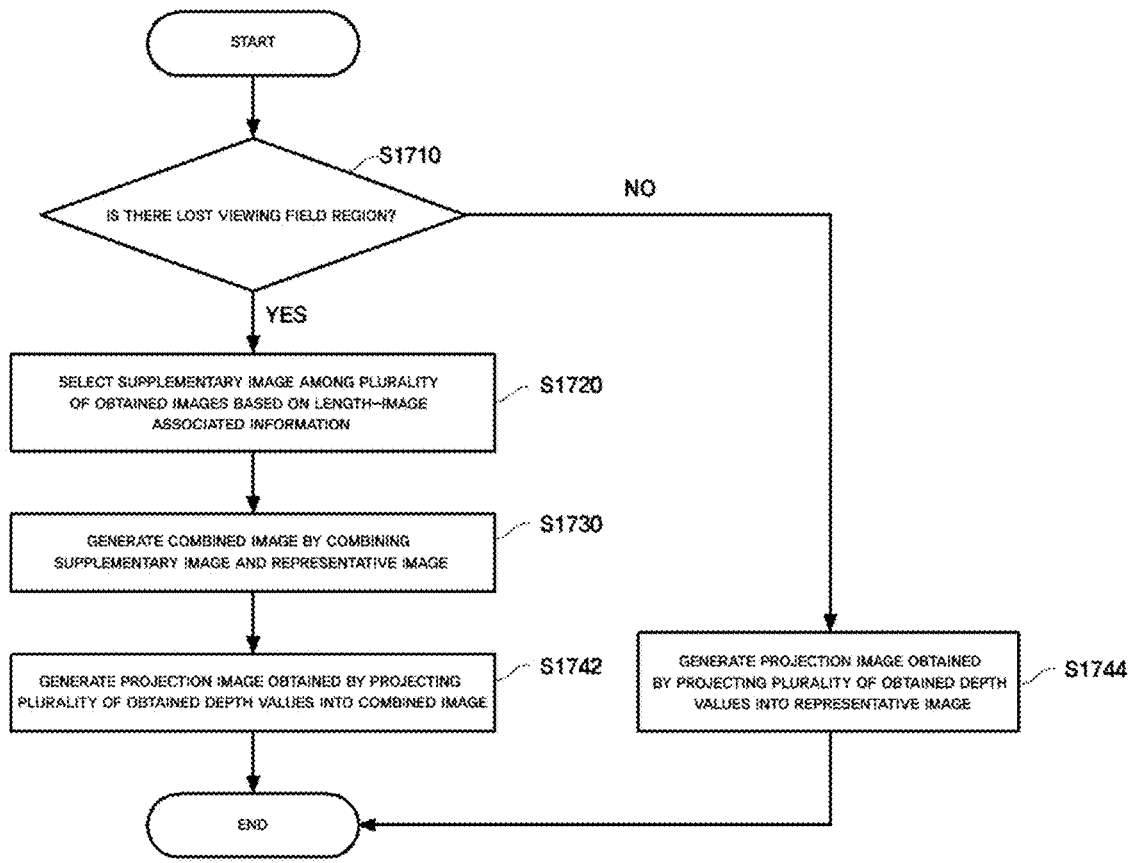

[Figure 18]
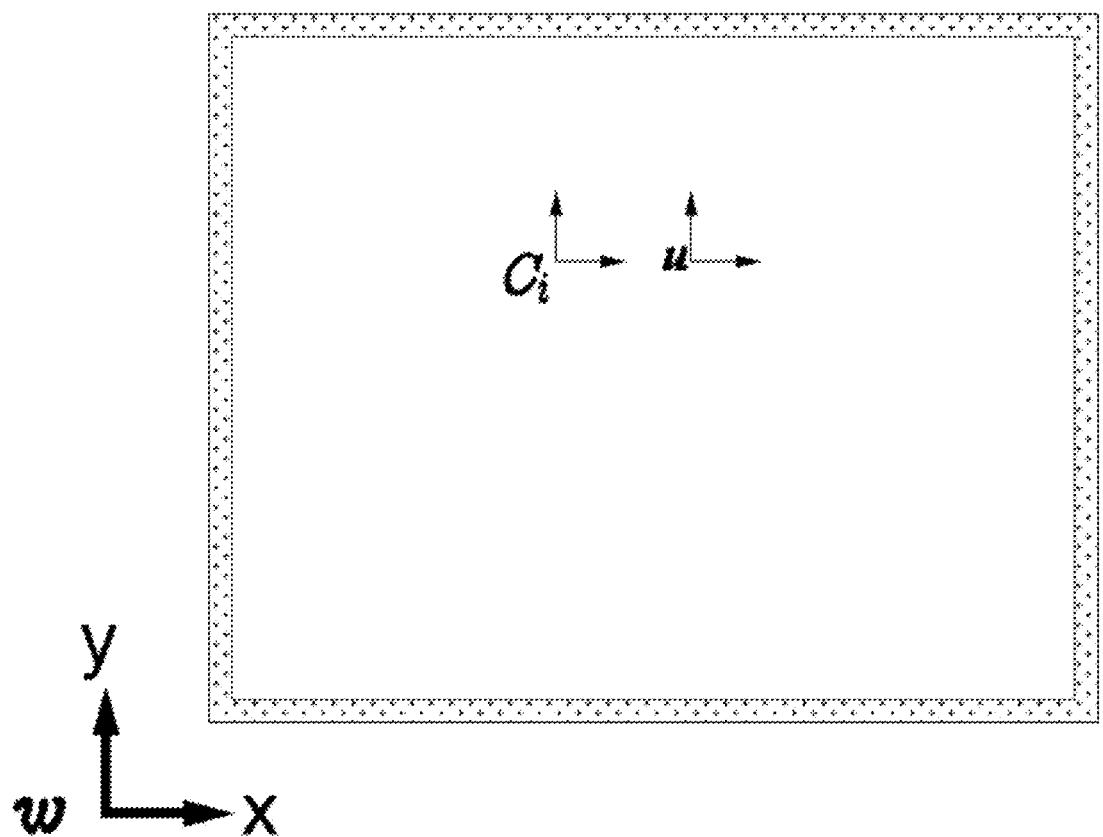

[Figure 19]
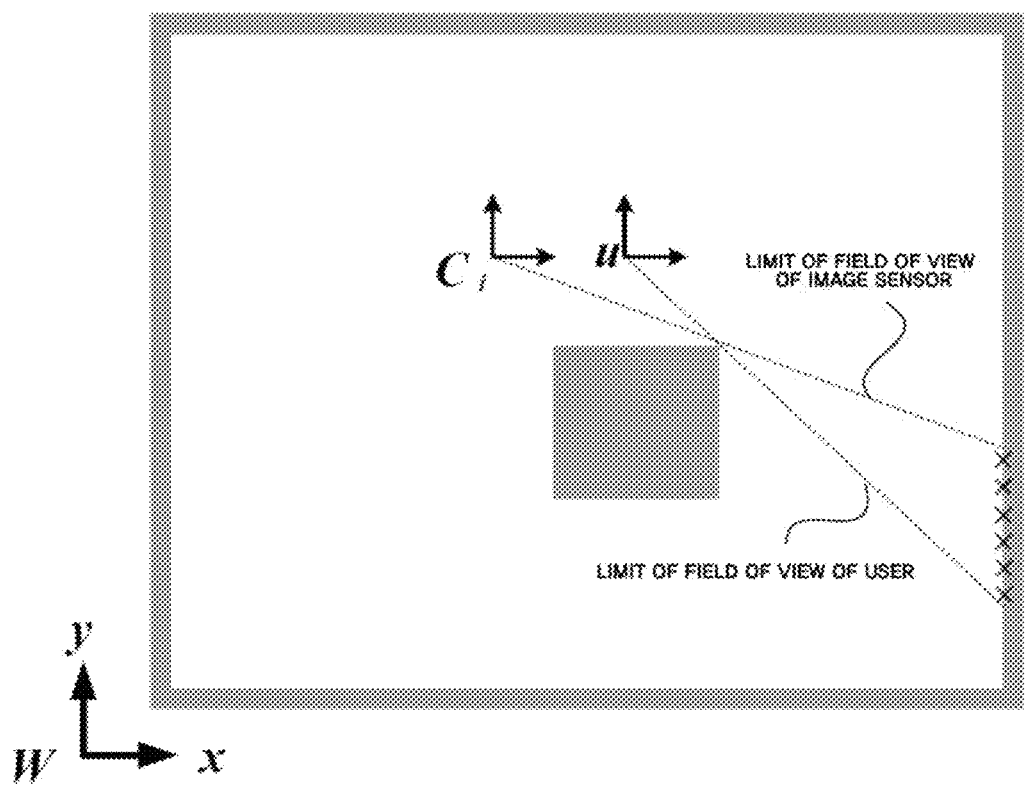

[Figure 20]
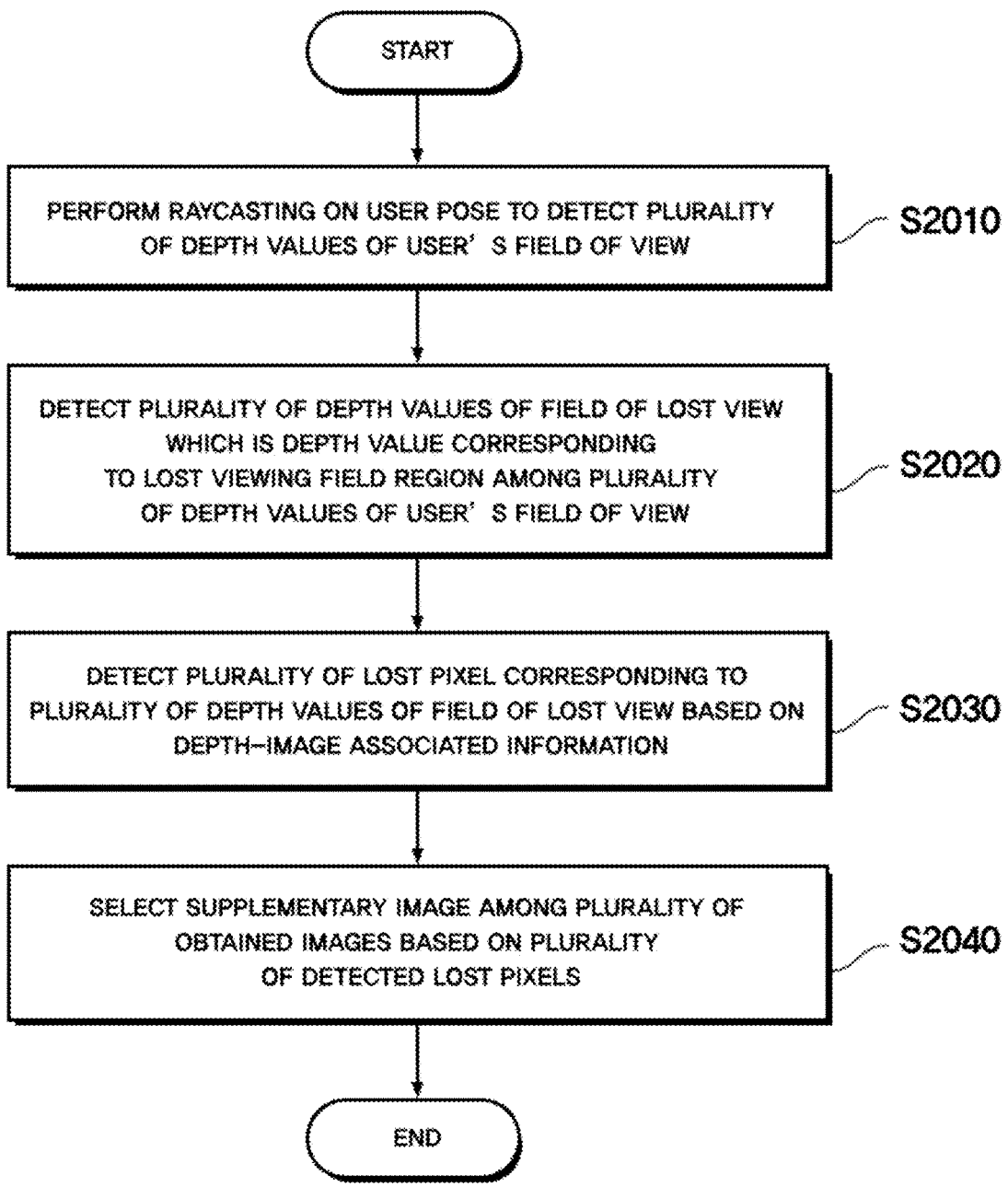

[Figure 21]
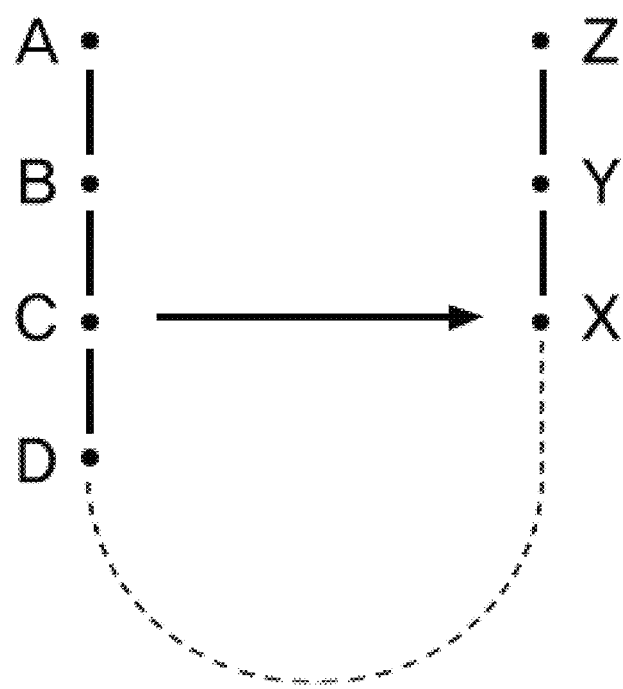
[Figure 22]
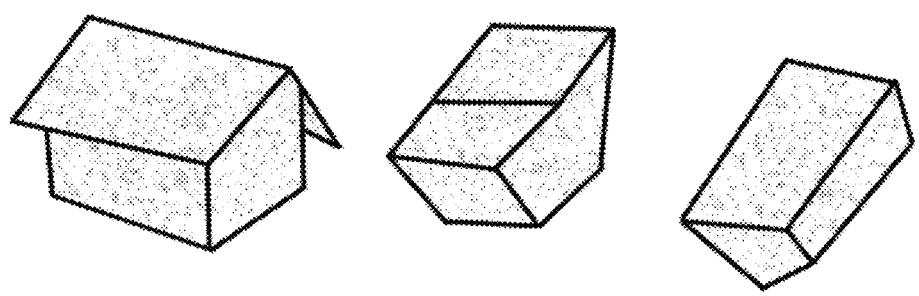

[Figure 23]
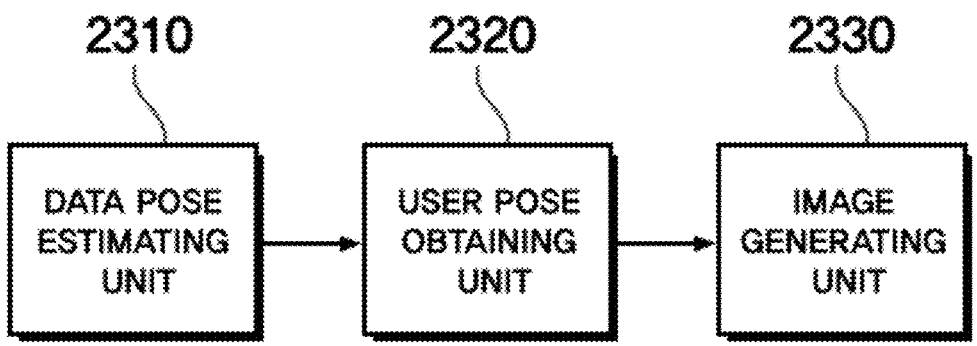
[Figure 24]
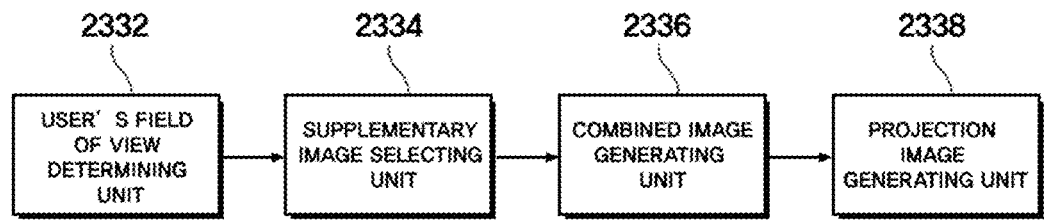

[Figure 25]
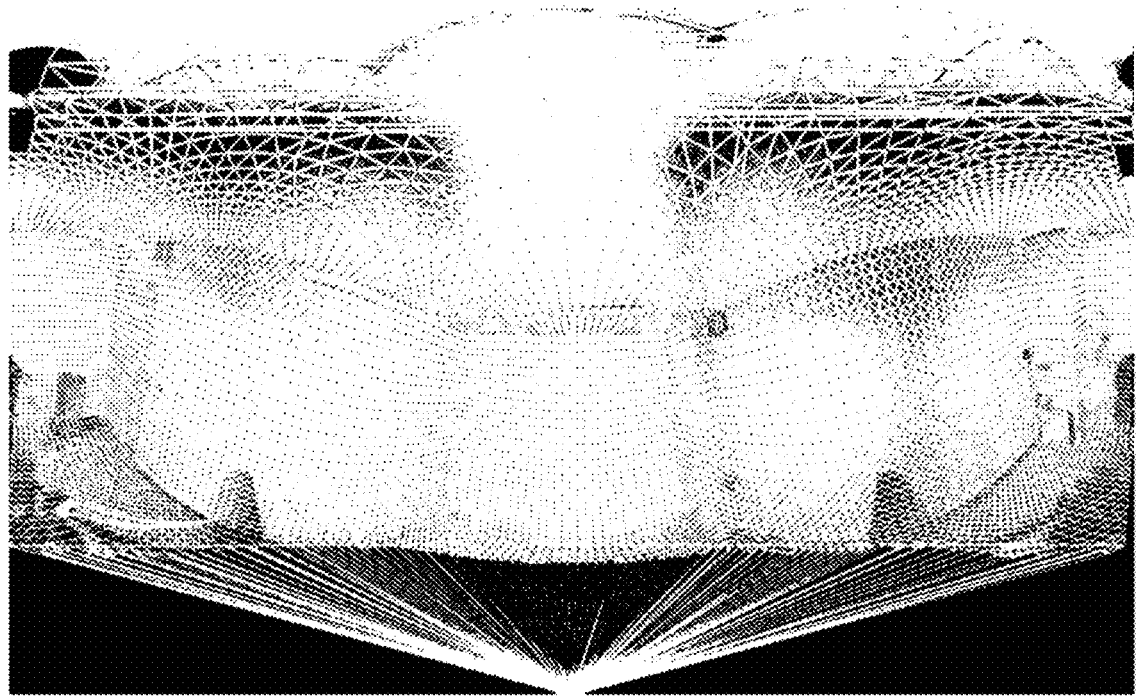

METHOD AND APPARATUS FOR GENERATING PROJECTION IMAGE, METHOD FOR MAPPING BETWEEN IMAGE PIXEL AND DEPTH VALUE

CROSS-REFERENCE TO RELATED APPLICATIONS

This application is the U.S. National Phase of International Patent Application No. PCT/KR2016/006961, filed Jun. 29, 2016, which claims priority to Korea Patent Application Nos. 10-2015-0097442, filed Jul. 8, 2015 and 10-2016-0056447, filed May 9, 2016. The contents of all applications are incorporated herein by reference in their entirety.

TECHNICAL FIELD

The present disclosure relates to image generation, and more particularly, to a method and an apparatus for generating a projection image for a three-dimensional space, and a mapping method between an image pixel and a depth value.

BACKGROUND ART

Various methods for representing indoor and outdoor environments using digital information have been introduced since 100 years ago. A camera is introduced in order to obtain image information of an environment and various range finders are introduced in order to obtain depth information of the environment. Further, recently, a sensor system which simultaneously obtains an image and a depth value obtained through JUMP by Google or Project Beyond by Samsung to produce a 3D image and provides the 3D image to a user through a head mount display (HMD) is also launched. However, since the above-mentioned systems may obtain data in only one location, there is a limitation that only information on a specific field of view in a specific pose (a location and an angle in a two-dimensional or a three-dimensional space) may be recorded.

In order to overcome the above limitation, several images and depths may be obtained at narrow intervals. For example, in a street view map service of an Internet portal, images are photographed at narrow intervals and the same implementation may be achieved also in JUMP or Project Beyond.

However, the related art may have a limitation that when a virtual user is located in a pose where no image is obtained, a 3D image corresponding to the location may not be generated. According to the related art, when the virtual user is located in a pose on a virtual 3D space where no image is obtained, images obtained in poses before and after the pose are mixed to display a 3D image. Further, an image obtained in a next pose is used to display a 3D image as the user moves. Therefore, according to the related art, the user may feel that the image is unnatural.

In order to overcome the above problem, an image and a depth value are obtained from a plurality of continuous poses so that a natural 3D image may be displayed as the user moves. However, in this case, there is a limitation that only when the user moves along the same route as the route where the image and the depth value are obtained, the natural 3D image may be displayed. In other words, the user cannot move out of the route from which the image is obtained so that there is a limitation that the method may be used only to produce contents for experiencing a ride such as a roller coaster.

Further, when the image is photographed by an omnidirectional camera, a method which moves a field of view to the left and right with respect to a center point of the corresponding image to produce a binocular image and display the binocular image through a head mount display (HMD) device is used. However, according to this method, even though the photographed image may rotate at 360 degrees in accordance with a characteristic of the omnidirectional camera to be watched as a 3D image, there is a limitation that the image cannot be watched out of the photographing route.

As described above, the related art has a problem in that in the indoor and outdoor environment, a realistic 3D image in accordance with arbitrary movement and arbitrary rotation of the user cannot be provided.

DISCLOSURE

Technical Problem

An object to be achieved by the present disclosure is to provide a projection image generating method and apparatus which provide a realistic 3D image corresponding to the arbitrary movement and the arbitrary rotation.

Technical Solution

According to an aspect of the present disclosure, there is provided a projection image generating method. The projection image generating method includes: estimating a plurality of image obtaining poses and a plurality of depth obtaining poses including obtaining positions and obtaining angles of a plurality of obtained images and a plurality of obtained depth values obtained in an actual 3D space, respectively, with respect to a reference coordinate system; obtaining a user pose including a location and an angle of the user in a virtual 3D space corresponding to the actual 3D space with respect to the reference coordinate system; and generating a projection image obtained by projecting the plurality of obtained depth values into at least one of the plurality of obtained images, based on the corresponding image obtaining pose corresponding to the user pose and at least one corresponding depth obtaining pose.

Preferably, at least one of the plurality of obtained images used to generate the projection image may be an obtained image obtained in the corresponding image obtaining pose and a representative image which is set to be an image representative of an obtained coordinate system which is a coordinates system having the corresponding image obtaining pose as an original point, the plurality of obtained depth values used to generate the projection image may be a plurality of depth values obtained in the corresponding depth obtaining pose and include a plurality of corresponding depth values which are depth values included in an angle of view of the representative image among a plurality of depth values with respect to an original point of the reference coordinate system or a plurality of depth values with respect to an original point of the obtained coordinate system.

Preferably, in the generating of a projection image, the projection image may be generated by projecting the plurality of corresponding depth values into a plurality of corresponding pixels which is pixels included in the representative image corresponding to each of the plurality of corresponding depth values.

Preferably, when the user pose is different from the corresponding image obtaining pose and a region on the virtual 3D space corresponding to a viewing angle of the user in the user pose has a lost viewing field region which is not included in the representative image, the generating of a projection image may include generating the projection image using a supplementary image which is an obtained image including a plurality of lost pixels which are pixels corresponding to the lost viewing field region among the plurality of obtained images excluding the representative image and the representative image.

Preferably, the generating of the projection image using the supplementary image and the representative image may include: determining whether there is the lost viewing field region; when it is determined that there is the lost viewing field region, selecting the supplementary image from the plurality of obtained images based on depth-image associated information to which the plurality of obtained depth values corresponding to the plurality of pixels included in the plurality of obtained images is matched; generating a combined image by mutually combining the supplementary image with a lower weight than the representative image; and generating a projection image obtained by projecting the plurality of obtained depth values into the combined image.

Preferably, the selecting of the supplementary image from the plurality of obtained images may include detecting a plurality of depth values of user's field of view which is a depth value included in a viewing angle of the user by performing ray casting on the user pose; detecting a plurality of depth values of fields of lost view which is a depth value corresponding to the lost viewing field region among the plurality of depth values of user's field of view; detecting the plurality of lost pixels corresponding to the plurality of depth values of the field of lost view based on the depth-image associated information; and selecting the supplementary image from the plurality of obtained images, based on the plurality of detected lost pixels.

Preferably, the depth-image associated information may be calculated by calculating a plurality of first depth value distances which is a distance from the plurality of obtained depth values obtained in the depth obtaining pose to the depth obtaining pose; converting the first depth value distance into a plurality of second depth value distances which is a distance from each of the plurality of obtained depth values obtained in the depth obtaining pose to the image obtaining pose, using the image obtaining pose and the depth obtaining pose; and mapping the plurality of obtained depth values to the plurality of pixels included in the obtained image, using a camera matrix corresponding to an image sensor used to obtain the obtained image and the plurality of second depth value distances.

Preferably, the calculating of a plurality of first depth value distances which is a distance from the plurality of obtained depth values obtained in the depth obtaining pose to the depth obtaining poses may be performed only using the plurality of obtained depth values whose each of obtaining time of the plurality of obtained depth values is within a predetermined time interval.

Preferably, when the user pose is equal to the corresponding image obtaining pose and the angle of view of the obtained image obtained in the corresponding image obtaining pose is larger than an angle of view of a depth map configured by the plurality of obtained depth values obtained in the corresponding depth obtaining pose, the generating of a projection image may be performed using the plurality of depth maps obtained from the plurality of corresponding depth obtaining poses within a predetermined distance from the corresponding image obtaining pose in which the representative image is obtained and the representative image.

Preferably, when the user pose is equal to the corresponding image obtaining pose and the angle of view of the obtained image obtained in the corresponding image obtaining pose is larger than an angle of view of a depth map configured by the plurality of obtained depth values obtained in the corresponding depth obtaining pose, the generating of a projection image may be performed using a grouping depth map which is generated by previously grouping the plurality of depth maps obtained from the plurality of corresponding depth obtaining poses within a predetermined distance from the corresponding image obtaining pose in which the representative image is obtained and the representative image.

Preferably, a depth map configured by the plurality of obtained depth values may be configured by an obtained depth value of a mesh structure based on a predetermined parameter.

Preferably, the generating of a projection image may be performed only using the obtained depth value obtained within a predetermined time from a time when the plurality of obtained images to be used to generate the projection image among the plurality of obtained depth values.

Preferably, the obtained angle included in each of the plurality of image obtaining pose may be an omni-directional angle when the obtained image included in each of the plurality of image obtaining poses is obtained by an omni-directional camera.

Further, according to another aspect of the present disclosure, there is provided a projection image generating method. The projection image generating method includes estimating a plurality of image obtaining poses including an obtaining location and an obtaining angle of the plurality of obtained images obtained in an actual 3D space with respect to the reference coordinate system and estimating a plurality of depth obtaining poses corresponding to a plurality of obtained depth values with respect to an obtained coordinate system having each of the plurality of image obtaining poses as an original point; obtaining a user pose including a location and an angle of the user in a virtual 3D space corresponding to the actual 3D space with respect to the reference coordinate system; and generating a projection image obtained by projecting the plurality of obtained depth values into at least one of the plurality of obtained images, based on the corresponding image obtaining pose corresponding to the user pose and at least one corresponding depth obtaining pose.

Further, according to another aspect of the present disclosure, there is provided a projection image generating method. The projection image generating method includes a data pose estimating unit which estimates a plurality of image obtaining poses and a plurality of depth obtaining poses including obtaining positions and obtaining angles of a plurality of obtained images and a plurality of obtained depth values obtained in an actual 3D space, with respect to a reference coordinate system; a user pose obtaining unit which obtains a user pose including a location and an angle of the user in a virtual 3D space corresponding to the actual 3D space with respect to the reference coordinate system; and an image generating unit which generates a projection image obtained by projecting the plurality of obtained depth values into at least one of the plurality of obtained images, based on the corresponding image obtaining pose corresponding to the user pose and at least one corresponding depth obtaining pose.

Preferably, at least one of the plurality of obtained images used to generate the projection image may be a representative image which is set to be an image representative of an obtained coordinate system which is a coordinates system having the corresponding image obtaining pose as an original point, as an obtained image obtained in the corresponding image obtaining pose, and the plurality of obtained depth values used to generate the projection image may include a plurality of corresponding depth values which are depth values included in an angle of view of the representative image among a plurality of depth values with respect to an original point of the reference coordinate system or a plurality of depth values with respect to an original point of the obtained coordinate system as a plurality of depth values obtained in the corresponding depth obtaining pose.

Preferably, when the corresponding image obtaining pose is different from the user pose and a region on the virtual 3D space corresponding to a viewing angle of the user in the user pose has a lost viewing field region which is not included in the representative image, the image generating unit may generate the projection image using a supplementary image which is an obtained image including a plurality of lost pixels which are pixels corresponding to the lost viewing field region among the plurality of obtained images excluding the representative image and the representative image.

Preferably, the image generating unit may include a user's field of view determining unit which determines whether there is the lost viewing field region; a supplementary image selecting unit which, when it is determined that there is the lost viewing field region, selects the supplementary image from the plurality of obtained images based on depth-image associated information to which the plurality of obtained depth values corresponding to the plurality of pixels included in the plurality of obtained images is matched; a combined image generating unit which generates a combined image by mutually combining the supplementary image with a lower weight than the representative image; and a projection image generating unit which generates a projection image obtained by projecting the plurality of obtained depth values into the combined image.

Preferably, when the user pose is equal to the corresponding image obtaining pose and the angle of view of the obtained image obtained in the corresponding image obtaining pose is larger than an angle of view of a depth map configured by the plurality of obtained depth values obtained in the corresponding depth obtaining pose, the image generating unit may generate the projection image using the plurality of depth maps obtained from the plurality of corresponding depth obtaining poses within a predetermined distance from the corresponding image obtaining pose in which the representative image is obtained and the representative image.

Further, according to another aspect of the present disclosure, there is provided a projection image generating apparatus. The projection image generating apparatus includes a data pose estimating unit which estimates a plurality of image obtaining poses including an obtaining location and an obtaining angle of the plurality of obtained images obtained in an actual 3D space with respect to the reference coordinate system and estimates a plurality of depth obtaining poses corresponding to a plurality of obtained depth values with respect to an obtained coordinate system having each of the plurality of image obtaining poses as an original point; a user pose obtaining unit which obtains a user pose including a location and an angle of the user in a virtual 3D space corresponding to the actual 3D space with respect to the reference coordinate system; and an image generating unit which generates a projection image obtained by projecting the plurality of obtained depth values into at least one of the plurality of obtained images, based on the corresponding image obtaining pose corresponding to the user pose and at least one corresponding depth obtaining pose.

Further, according to another aspect of the present disclosure, there is provided a mapping method between an image pixel and a depth value. The mapping method includes estimating an image obtaining pose and a depth obtaining pose including an obtaining position and an obtaining angle of an obtained image and an obtained depth value obtained in an actual 3D space, with respect to a reference coordinate system; calculating a plurality of first depth value distances which is a distance from the plurality of obtained depth values obtained in the depth obtaining pose to the depth obtaining poses; converting the first depth value distance into a plurality of second depth value distances into a plurality of second depth value distances which is a distance from each of the plurality of obtained depth values obtained in the depth obtaining pose to the image obtaining pose, using the image obtaining pose and the depth obtaining pose; and mapping the plurality of obtained depth values to the plurality of pixels included in the obtained image, using a camera matrix corresponding to an image sensor used to obtain the obtained image and the plurality of second depth value distances.

Preferably, the converting into the plurality of second depth value distances may be performed by mutually multiplying an inverse matrix of a matrix indicating an image obtaining pose, a matrix indicating a depth obtaining pose, and a first depth value distance, respectively.

Preferably, when a resolution of an image sensor used to obtain the obtained image is higher than a resolution of a distance sensor used to obtain the obtained depth value, the mapping of the plurality of obtained depth values to the plurality of pixels included in the obtained image may include selecting three or more initial associated depth values among initial associated depth values which are a plurality of obtained depth values mapped to the image pixel to configure a polygonal mesh; calculating the number and the location of the plurality of unmapped pixels which is included in the polygonal mesh among the plurality of unmapped pixels which is image pixels which do not have corresponding obtained depth values, based on a resolution of the image sensor; estimating the plurality of depth values corresponding to the plurality of unmapped pixels based on the number and the position of the plurality of calculated unmapped pixels; and mapping the plurality of estimated depth values to the plurality of unmapped pixels.

Preferably, the estimating of the plurality of depth values corresponding to the plurality of unmapped pixels may be performed using interpolation.

Advantageous Effects

According to an exemplary embodiment of the present disclosure, an image is displayed in association with an obtained coordinate system of an image obtaining pose where the image is obtained, so that image distortion generated when an image obtained with respect to the obtaining coordinate system is converted with respect to the reference coordinate system may be removed. Specifically, the image is obtained by utilizing a wide angle image sensor having an angle of view which is larger than the field of view of a user. Therefore, when the user takes a look around at one fixed location, the user may see one wide angle image photographed in the same condition, which may provide a natural and realistic image to the user.

According to another exemplary embodiment of the present disclosure, only one representative image which interworks for every obtained coordinate system of an image obtaining pose is used to generate a projection image. Therefore, the projection image may be generated with a significantly reduced data amount as compared with the related art.

According to still another exemplary embodiment of the present disclosure, a representative image which interworks for every obtained coordinate system of an image obtaining pose is used to generate a projection image. Therefore, when an image corresponding to an actual 3D space is changed, a new obtained image is obtained only for the corresponding image obtaining pose to be set as a representative image as if a sign is changed. Therefore, the entire images data may be easily upgraded to latest image data.

According to still another exemplary embodiment, it is confirmed that which pixel of the obtained image is included in a field of view of the user by a depth value through depth-image associated information. Further, it is confirmed that which obtained image needs to enter a field of view of the user therethrough. Therefore, even when the user is located in a user pose which is out of the image obtaining route, a projection image corresponding to an arbitrary field of view of the user in the corresponding user pose may be generated.

According to still another exemplary embodiment of the present disclosure, a projection image is generated using a plurality of depth maps corresponding to an angle of view of an obtained image using depth-image associated information. Therefore, a projection image having a wide angle of view corresponding to a wide angle of view of the image sensor may be generated even using a distance sensor having an angle of view narrower than an angle of view of the image sensor.

According to still another exemplary embodiment of the present disclosure, when a projection image is generated using a combined image obtained by combining a representative image and a supplementary image, an image distortion of a projection image which is generated using a plurality of images by a method of combining the images with different weights may be minimized.

According to another exemplary embodiment of the present disclosure, an obtained depth value which is used to generate a projection image may be selected from a plurality of obtained depth values based on a time when the obtained image and the obtained depth value are obtained, respectively. Therefore, the image distortion due to ring closure situation may be minimized.

DESCRIPTION OF DRAWINGS

FIG. 1 is a flowchart illustrating a projection image generating method according to an exemplary embodiment of the present disclosure.

FIG. 2 is a view illustrating an example that a depth value of the present disclosure is represented by a basis vector.

FIG. 3 is a view illustrating an example of an integrated sensor for simultaneously obtaining an image and a depth value.

FIG. 4 is a view illustrating a 3D image generated with respect to a reference coordinate system of the related art.

FIG. 5 is a view illustrating an image distortion in accordance with a location estimating error.

FIGS. 6a and 6b are views illustrating a depth obtaining pose in accordance with a reference coordinate system.

FIGS. 7a and 7b are views illustrating a geographical feature distortion and an image distortion in accordance with a location estimating error.

FIG. 8 is a view illustrating an angle of view of the image sensor.

FIG. 9 is a view illustrating an angle of view of the distance sensor.

FIG. 10 is a view illustrating a method for generating a projection image using one image obtaining pose and a plurality of depth obtaining poses.

FIG. 11 is a view illustrating an example of grouping depth values.

FIG. 12 is a view illustrating a ring closure situation.

FIG. 13 is a view illustrating a depth value grouping distortion in a ring closure situation.

FIG. 14 is a flowchart illustrating a method for generating a depth-image associated information according to an exemplary embodiment of the present disclosure.

FIG. 15A is a view illustrating a depth-image association according to an exemplary embodiment of the present disclosure.

FIG. 15B is a view illustrating a depth-image association according to another exemplary embodiment of the present disclosure.

FIG. 15C is a view illustrating a depth-image association according to still another exemplary embodiment of the present disclosure.

FIG. 16 is a flowchart illustrating a projection image generating method according to another exemplary embodiment of the present disclosure.

FIG. 17 is a flowchart illustrating a projection image generating method when a lost viewing field region is present according to an exemplary embodiment of the present disclosure.

FIG. 18 is a view illustrating an environment where an angle of view of an image sensor includes a field of view of a user.

FIG. 19 is a view illustrating an environment where an angle of view of an image sensor does not include a field of view of a user.

FIG. 20 is a flowchart illustrating a supplementary image selecting method according to an exemplary embodiment of the present disclosure.

FIG. 21 is a view illustrating a difference between the present disclosure and the related art in accordance with movement of a user.

FIG. 22 is a view illustrating a parameter based depth value mesh structure according to an exemplary embodiment of the present disclosure.

FIG. 23 is a view illustrating a projection image generating apparatus according to an exemplary embodiment of the present disclosure.

FIG. 24 is a view illustrating an image generating unit according to an exemplary embodiment of the present disclosure.

FIG. 25 is a view illustrating a polygonal mesh structure of a depth value according to an exemplary embodiment of the present disclosure.

BEST MODE

Those skilled in the art may make various modifications to the present invention and the present invention may have various embodiments thereof, and thus specific embodiments will be illustrated in the drawings and described in detail in the detailed description. However it should be understood that the invention is not limited to the specific embodiments, but includes all changes, equivalents, or alternatives which are included in the spirit and technical scope of the present invention. In the description of respective drawings, similar reference numerals designate similar elements.

Terms such as first or second may be used to describe various components but the components are not limited by the above terminologies. The above terminologies are used only to discriminate one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween.

Terms used in the present application are used only to describe specific exemplary embodiments, and are not intended to limit the present invention. A singular form may include a plural form if there is no clearly opposite meaning in the context. In the present invention, it should be understood that term "include" or "have" indicates that a feature, a number, a step, an operation, a component, a part or the combination thereof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present invention.

Hereinafter, exemplary embodiments according to the present disclosure will be described in detail with reference to accompanying drawings.

FIG. 1 is a flowchart illustrating a projection image generating method according to an exemplary embodiment of the present disclosure.

In step S110, a projection image generating apparatus estimates a plurality of image obtaining poses and a plurality of depth obtaining poses including obtaining positions and obtaining angles of a plurality of obtained images and a plurality of obtained depth values in an actual 3D space, respectively, with respect to a reference coordinate system.

In this case, it is assumed that the projection image generating apparatus stores not only a plurality of image obtaining poses including a position where the plurality of obtained images is obtained and an angle (including angles for a yaw, a pitch, and a rolling) at which the corresponding image is obtained and the plurality of depth obtaining poses including a position where the plurality of obtained depth values is obtained and an angle (including angles for a yaw, a pitch, and a rolling) at which the depth value is obtained, but also information on an obtained image obtained in each of the image obtaining poses and an image obtaining time (an absolute obtaining time, a relative obtaining time, or an order of the obtained images, and the like) and information on an obtained depth value obtained in each of the depth obtaining poses and a depth value obtaining time (an absolute obtaining time, a relative obtaining time, or an order of the obtained depth values, and the like). However, according to another exemplary embodiment, the image obtaining pose may include only the position where the image is obtained and the depth obtaining pose may include only the position where the depth value is obtained. Further, when the obtained image included in each of the plurality of image obtaining poses is obtained by an omni-directional camera, the obtained angle included in the image obtaining pose may be an omni-directional angle.

Here, the obtained image is a 2D image with respect to a 3D space which may be represented by a basis vector having two degrees of freedom. Further, the obtained image may have a shape which two-dimensionally represents a 3D color value or two-dimensionally represents 3D column information by mounting an IR filter in the camera.

Further, the obtained image may be a panorama image or a wide angle image which is generated using a plurality of cameras. However, since the image of the present disclosure is defined to be represented by the basis vector having two degrees of freedom, the image may have not only a general quadrangular form but also other geometrical form.

Further, the obtained depth value has a dot shape which may be represented by a basis vector having three degrees of freedom. The obtained depth value may be obtained using a distance sensor or estimated using two or more images photographed in different places. An example of the depth value obtained using a distance sensor is a depth value obtained through a LIDAR, a SONAR, an infrared distance detector, or a time of flight (TOF) distance detector. An example of the depth value estimated using two or more images is a depth value obtained using a stereo camera, a multi-camera, or an omni-directional stereo camera. In the meantime, when a device such as Kinect, JUMP, Prime Sense, Project Beyond is used, the obtained image, and the obtained depth value may be simultaneously obtained.

FIG. 2 is a view illustrating an example that a depth value of the present disclosure is represented by a basis vector. The depth value may be represented by a basis vector having three degrees of freedom using a polar coordinate system expressed by $\alpha$, $\beta$, and $\gamma$ as illustrated at a left side or a Cartesian coordinate system expressed by X, Y, and Z as illustrated at a right side. Here, the depth value may be configured by a single point shape or a plurality of point shapes. The depth value may include a set of depth values having a mesh structure based on a triangle configured by points and a set of depth values having a specific geometrical shape.

For example, according to an exemplary embodiment of the present disclosure, in addition to an obtained depth value obtained by a distance sensor, a depth value may be newly estimated by interpolation to be used. More specifically, after configuring a polygonal (including a triangle) mesh by selecting three or more depth values from a plurality of obtained depth values, interpolation is applied into the polygonal mesh to estimate and add a new depth value.

In the meantime, the obtained image and the obtained depth value according to an exemplary embodiment of the present disclosure may be simultaneously obtained using an integrated sensor as illustrated in FIG. 3.

FIG. 3 is a view illustrating an example of an integrated sensor for simultaneously obtaining an image and a depth value. In FIG. 3, an integrated sensor in which a wide angle image sensor at an upper portion and a distance sensor (Lidar) at a lower portion are combined is illustrated. In this case, the wide angle image sensor may have an omnidirectional angle of view in vertical and horizontal directions. However, the distance sensor such as a Lidar generally has a narrow angle of view which is a predetermined degree. In the meantime, according to another exemplary embodiment, the pose on the 3D space may be estimated further using an inertial sensor, an accelerometer, a geomagnetic sensor, or a wireless communication signal.

In the present disclosure, the projection image generating apparatus estimates the plurality of image obtaining poses and the plurality of depth obtaining poses, which have been stored in advance with respect to the reference coordinate system, with respect to the reference coordinate system. The reference coordinate system is called an absolute coordinate system W and is a method which represents all poses with respect to a specific single original point. On the contrary, there is an obtained coordinate system as a concept which is opposite to the reference coordinate system. The obtained coordinate system is also called a local coordinate system and has a plurality of original points. According to the obtained coordinate system, the pose is represented with respect to each of a plurality of original points.

For example, when the image is obtained using a plurality of cameras, if the image obtaining pose in which the image is obtained is represented with respect to the reference coordinate system, a pose of each of the plurality of cameras is represented with respect to one specific original point. However, when the image obtaining pose is represented with respect to the obtained coordinate system, all of a plurality of points where each of the plurality of cameras is located becomes original points of individual obtaining coordinate systems.

Basically, the reference coordinate needs to set only one original point. However, when the reference coordinate system is applied to a building configured by a plurality of floors, the reference coordinate system is set for individual floors so that the original point may be set for individual floors.

In step S120, the projection image generating apparatus obtains a user pose including the position and the angle of the user in a virtual 3D space corresponding to an actual 3D space with respect to the reference coordinate system.

Here, the user pose may be a position of an avatar of the user which is represented in the virtual 3D space and an angle of a direction of a user's field of view.

In step S130, the projection image generating apparatus generates a projection image obtained by projecting the plurality of obtained depth values onto at least one of the plurality of obtained images based on a corresponding image obtaining pose and at least one corresponding depth obtaining pose corresponding to the user pose.

Here, the corresponding image obtaining pose refers to an image obtaining pose corresponding to the user pose and the corresponding depth obtaining pose refers to a depth obtaining pose corresponding to the user pose. For example, one image obtaining pose and at least one depth obtaining pose present within a predetermined distance from the user pose are determined as a corresponding image obtaining pose and a corresponding depth obtaining pose. Alternatively, one image obtaining pose and one depth obtaining pose present in a distance closest to the user pose may be determined as a corresponding image obtaining pose and a corresponding depth obtaining pose. Further, the corresponding image obtaining pose may be determined by an image obtaining pose from which an obtained image having a highest overlapping degree with the user's field of view in the user pose is obtained.

In the meantime, it may be determined that the user pose is equal to the corresponding image obtaining pose and the depth obtaining pose or is different from the corresponding image obtaining pose and the depth obtaining pose. For example, when a difference between the user pose and the corresponding image obtaining pose and a difference between the user pose and the corresponding depth obtaining pose are within a predetermined threshold value, respectively, it is determined that the user pose is equal to the corresponding image obtaining pose and the depth obtaining pose, respectively. Otherwise, it is determined that the user pose is different from the corresponding image obtaining pose and the depth obtaining pose, respectively.

In the meantime, according to an exemplary embodiment of the present disclosure, the obtained image which is used to generate the projection image is an obtained image obtained from the corresponding image obtaining pose. The image may be a representative image which is set as an image which is representative of the obtaining coordinate systems which are a coordinate system having the corresponding image obtaining pose as an original point. Further, the plurality of obtained depth values which is used to generate the projection image is a plurality of depth values obtained from the corresponding depth obtaining pose. The plurality of obtained depth values may be a plurality of depth values with respect to the original point of the reference coordinate system or a plurality of corresponding depth values which is a depth value included in an angle of view of a representative image among a plurality of depth values with respect to the original point of the obtained coordinate system.

That is, according to the exemplary embodiment of the present disclosure, a representative image may be set for each of the corresponding image obtaining poses with respect to the obtained coordinate system. Therefore, when the user enters a specific obtained coordinate system, only one representative image is represented in the obtained coordinate system. By doing this, as compared with a projection image generating method with respect to the reference coordinate system of the related art which generates a projection image corresponding to a user's pose by combining a number of images having a predetermined size as illustrated in FIG. 4 which will be described below, a natural image having a minimized distortion may be displayed to the user. Further, as described above, a representative image which interworks for every obtained coordinate system of the plurality of corresponding image obtaining poses is set. Therefore, when an image corresponding to an actual 3D space is changed, for example, when a surrounding environment of the actual 3D space is changed, a newly obtained image only for a corresponding image obtaining pose is obtained as if a sigh is substituted, to set the newly obtained image as a representative image. As a result, the entire image data may be easily upgraded to the newest image data.

More specifically, according to the exemplary embodiment of the present invention, the projection image generating apparatus projects the plurality of corresponding depth values to a plurality of corresponding pixels which are pixels included in the representative image corresponding to each of the plurality of corresponding depth values included in an angle of view of the representative image to generate the projection image.

In this case, the corresponding pixels corresponding to the corresponding depth value is determined based on depth-image associated information. A specific operation of generating the depth-image associated information will be described below with reference to FIGS. 14 and 15.

In the meantime, according to another exemplary embodiment of the present invention, the projection image may be generated by projecting a plurality of obtained depth values obtained from the plurality of corresponding depth obtaining poses onto one representative image obtained from one corresponding image obtaining pose. This may be generated due to a difference between an angle of view of the image and an angle of view of a depth map configured by a plurality of depth values. This will be described below with reference to FIGS. 8 to 10.

According to another exemplary embodiment, when the user pose is different from the corresponding image obtaining pose and there is a lost viewing field region which is not included in a representative image among regions on the virtual 3D space corresponding to a field of view of the user in the user pose, the projection image generating apparatus may generate the projecting image using a representative image and a supplementary image which is an obtained image including a plurality of lost pixels which is pixels corresponding to the lost viewing field region among a plurality of obtained images excluding the representative image. This will be described below with reference to FIGS. 17 to 20.

Hereinafter, image distortion which may be generated in the 3D image generating method of the related art will be described with reference to FIGS. 4 to 7.

FIG. 4 is a view illustrating a 3D image generated with respect to a reference coordinate system of the related art.

Referring to FIG. 4, a separate obtained image for each of the plurality of image obtaining poses is present with respect to the reference coordinate system. A plurality of images present for every image obtaining pose is combined and a depth value is projected onto the generated combined image to generate the projection image. Finally, two projection images corresponding to a left eye and a right eye are used to generate a 3D image. As described above, one image to be displayed to the user is generated by combining a plurality of obtained images each having an illumination difference and a shutter speed difference. Therefore, an unnatural combined image as illustrated in FIG. 4 is displayed to the user.

In the meantime, according to the related art, an image distortion may be generated due to a position estimating error of the image obtaining pose and the depth obtaining pose, respectively, which will be described with reference to FIG. 5.

FIG. 5 is a view illustrating an image distortion in accordance with a location estimating error.

Referring to FIG. 5, a view having an image distortion in which an image of a pillar is formed on a ground is illustrated. An absolute pose at a data (image or depth value) obtaining point is surely understood in a virtual 3D environment implemented by a computer. However, when the data is obtained in an actual 3D environment, absolute coordinate values of various poses from which the data is obtained may be estimated. Therefore, the above-mentioned distortion is generated because an estimating error is inevitably generated during the estimating process.

Hereinafter, the reason why the distortion is generated will be described in detail with reference to FIGS. 6 and 7.

FIG. 6 is a view illustrating a depth obtaining pose in accordance with a reference coordinate system.

In FIG. 6A, ideal depth obtaining poses ${}^w H_{L_1}, {}^w H_{L_2}, {}^w H_{L_3}$ without having an error are represented with respect to W. In FIG. 6B, estimated depth obtaining poses ${}^w \hat{H}_{L_1}, {}^w \hat{H}_{L_2}{}^1, {}^w \hat{H}_{L_3}$ having an error are represented with respect to W. Referring to FIG. 6B, it is understood that the farther from W, the larger an error of the estimated depth obtaining pose. That is, in FIG. 6B, it is understood that the error is increased in an ascending order of ${}^w \hat{H}_{L_1}, {}^w \hat{H}_{L_2}{}^1, {}^w \hat{H}_{L_3}$.

In FIG. 6, W indicates an original point of the reference coordinate system and Li (L1, L2, L3) indicates locations where the depth values are obtained. ${}^w H_{L_i}$ indicates a depth obtaining pose in each of the location of Li with respect to the reference coordinate W and may be defined by Equation 1.

$$ {}^w H_{L_i} = \begin{bmatrix} {}^w R_{L_i} & {}^w t_{L_i} \\ 0_{1\times 3} & 1 \end{bmatrix} \qquad [\text{Equation 1}]$$

Here, ${}^w R_{L_i}$ refers to a rotation matrix indicating a 3D angle to a location Li with respect to W. ${}^w t_{L_i}$ refers to a 3D movement distance to the location Li with respect to W. $0_{1\times 3}$ refers to a matrix of [0 0 0] and a depth obtaining pose ${}^w H_{L_1}$ is generated by uniting the above values.

In the meantime, the process of estimating an estimated depth obtaining pose ${}^w \hat{H}_{L_1}$ is performed by minimizing indexes such as a sum of errors $$\left( \sum_{all\ i} |{}^w H_{L_i} - {}^w \hat{H}_{L_i}| \right)$$

between the ideal depth obtaining pose ${}^w H_{L_i}$ and the estimated depth obtaining pose, a square of an absolute sum of the error $$\left( \sum_{all\ i} |{}^w H_{L_i} - {}^w \hat{H}_{L_i}|^2 \right),$$

and a nearest estimated error square in which probability distribution is considered.

However, Equation 1 indicates a depth obtaining pose in a 3D environment. In a 2D environment, the depth obtaining pose may be described by the same manner by lowering a dimension by a level. The depth obtaining pose may be defined in both the 3D environment and the 2D environment of the present disclosure. In the meantime, in Equation 1, the depth obtaining pose is represented using a H matrix, but the present disclosure is not limited thereto. The depth obtaining pose may be represented using a combination of a position vector and an angle vector, Euler, quaternion, dual quaternion, or Rodrigues expressions.

In the meantime, the image obtaining pose with respect to the reference coordinate system is represented by ${}^w H_{C_i}$ at a location Ci where the image is obtained. The ${}^w H_{C_i}$ may configured by uniting ${}^w R_{C_i}$ indicating a 3D angle to the location Ci with respect to W and ${}^w t_{C_i}$ indicating a 3D movement distance to the location Ci with respect to W. However, the present disclosure is not limited thereto and the image obtaining pose may be represented using various expressions other than the H matrix.

Further, generally, it is assumed that a pose relationship between the image sensor and the distance sensor is well known so that the pose relationship $^w H_{C_j}$ therebetween may be considered as a constant value. Therefore, when any one of the depth obtaining pose $^w H_{L_i}$ and the image obtaining pose $^w H_{C_j}$ is estimated, the other one may be estimated without performing separate measurement.

As illustrated in FIG. 6B, when the estimated depth obtaining poses $^w \hat{H}_{L_i}$ for all depth value obtaining locations Li are calculated and the estimated image obtaining poses $^w \hat{H}_{C_j}$ for all image obtaining locations Ci are calculated, the projection image is generated. In this case, as described above, the projection image is generated using a depth value obtained from the estimated depth obtaining poses $^w \hat{H}_{L_i}$ having an error and an image obtained from the estimated image obtaining pose $^w \hat{H}_{C_j}$ having an error so that the distortion may be generated in the projection image. This will be described in more detail with reference to FIG. 7.

FIG. 7 is a view illustrating a geographical feature distortion and an image distortion in accordance with a location estimating error.

In FIG. 7A, an obtained image Im and an obtained depth value Dm obtained in an ideal m-th data (image or depth value) pose $^w H_m$ with respect to the reference coordinate system having no error are illustrated. Further, an obtained image In and an obtained depth value Dn obtained in an ideal n-th data pose $^w H_n$ is illustrated in FIG. 7A. In this case, the portion marked by 0 indicates the pillar and the portion marked by X indicates the ground.

FIG. 7B illustrates an m-th estimated data pose $^w \hat{H}_m$ and an n-th estimated data pose $^w \hat{H}_n$ with respect to the reference coordinate system having an error. It is noticed that the m-th th estimated data pose $^w \hat{H}_m$ has almost no error from the ideal m-th data pose $^w H_m$ of FIG. 7A, but the n-th estimated data pose $^w \hat{H}_n$ has an error which is leaned to the right from the ideal n-th data pose $^w H_n$ of FIG. 7A.

However, it is difficult to actually detect the above-described error so that the projection image is generated from the corresponding data pose while having the error. Therefore, as illustrated in FIGS. 5 and 7B, an image distortion is generated such that an image of the pillar is projected onto the ground due to the location error.

As described above, the projection image generating method with respect to the reference coordinate system of the related art has a problem in that the image distortion as illustrated in FIGS. 5 and 7B may be generated due to the location error. In order to solve the above-problem, a projection image generating method with respect to the obtained coordinate system is provided. However, in this case, the image distortion due to the location estimating error is not generated. However, there is a problem in that the projection image may be generated only for a narrow field of view where the angle of view of the image sensor and the angle of view of the distance sensor overlap due to the difference of the angle of view of the image sensor and the angle of view of the distance sensor. For example, there are various devices which obtain images in all directions such as an omni-directional camera. However, there is no device which simultaneously detects the depth values in all directions. Therefore, when the projection image is generated using the depth value and the image obtained in one obtaining coordinate system, the projection image may be generated only at a narrow overlapping field of view. Therefore, the field of view of the user who watches the projection image may be restricted. This will be described with reference to FIGS. 8 and 9.

FIG. 8 is a view illustrating an angle of view of the image sensor.

Referring to FIG. 8, when a person who photographs an image using an image sensor photographs the image while watching an obstacle represented by gray color in a location Ci where the image is obtained, all regions (regions denoted by slanted lines) excluding a partial region (a white portion) on the person's feet and a right region (a white portion) of the obstacle where the photographing is restricted due to the gray obstacle become angles of view of the image sensor.

On the contrary, FIG. 9 is a view illustrating an angle of view of the distance sensor.

In FIG. 9, when a person who obtains a depth value using a distance sensor obtains the depth value while watching an obstacle represented by gray color in a location Li where the depth value is obtained, only a partial region denoted by slanted lines having a narrow range at front and rear sides of the Lj becomes an angle of view of the distance sensor. Therefore, only the projection image in a region where the angle of view of the image sensor of FIG. 8 and the angle of view of the distance sensor of FIG. 9 overlap may be produced.

In order to solve the above problem, there is a method which obtains an image by one omni-directional sensor and an image and obtains an image at a location which moves from a center point of the image to the left and the right to produce a 3D image. In this case, it is advantageous that from the characteristic of the omni-directional image, the rotation may be freely performed at the location where the image is obtained. However, due to the absence of the depth value associated with the obtained image, there is a restriction in that the movement to the up, down, left, and right is not allowed. In order to overcome the above-mentioned restriction, a technique such as project beyond or JUMP which photographs one location using two cameras and combines the images photographed by the cameras to implement omni-directionally has been implemented. However, according to the above-described implementation, the combination of two cameras is utilized so that an angle of view of the image and an angle of view of the depth map corresponding thereto are equal to each other. however, the precision of the depth value is significantly lowered so that when the image obtaining pose or the depth obtaining pose are estimated with respect to the reference coordinate system, a large error may be generated. In this case, the distortion illustrated in FIG. 4 or 7 is generated. Further, as illustrated in FIG. 21, when the user moves from C to X when the photographing time is leaped in a space which is photographed in the order of A, B, C, D, . . . , X, Y, and Z, a sharp unnaturalness is generated at a time when change-over between two locations is generated, due to the pose estimating error in the location C and the pose estimating error in the location X. Further, when the user watches the images in the photographed order, a part of the 3D image instantly protrudes or dents due to the incorrect depth value, which results in unnaturalness. All the above-described phenomenon is undesirably amplified at the place where image information is insufficient.

According to the exemplary embodiment of the present disclosure, when the angle of view of the distance sensor is smaller than the angle of view of the image sensor, the projection image is generated using one image obtaining pose and a plurality of depth obtaining poses. Therefore, even though the user moves out of an image obtaining route, the projection image corresponding thereto may be provided, which will be described with reference to FIG. 10.

FIG. 10 is a view illustrating a method for generating a projection image using one image obtaining pose and a plurality of depth obtaining pose.

Referring to FIG. 10, an angle of view of a wide angle image sensor in a specific image obtaining pose is illustrated at an upper portion and angles of view of a distance sensor at different depth obtaining poses are illustrated at a lower portion. In FIG. 10, an angle of view of a distance sensor in a depth value obtaining location Lj−1 is illustrated at a left lower portion, an angle of view of a distance sensor in a depth value obtaining location Lj is illustrated at a center lower portion, and an angle of view of a distance sensor in a depth value obtaining location Lj+1 is illustrated at a right lower portion. The angle of view of the distance sensor is equal to an angle of view of a depth map configured by a depth value obtained by the distance sensor.

When the user pose is equal to the corresponding image obtaining pose and an angle of view of an obtained image obtained in the corresponding image obtaining pose is larger than an angle of view of the depth map configured by a plurality of obtained depth values obtained in the corresponding depth obtaining pose (same pose-different angle of view), the projection image is generated using a plurality of depth maps obtained from a plurality of corresponding depth obtaining poses within a predetermined distance from the corresponding image obtaining pose where the representative image is obtained and one representative image.

According to the related art, when the projection image is generated using a distance sensor having an angle of view which is smaller than an angle of view of the image sensor, only the projection image having a narrow angle of view corresponding to the narrow angle of view of the distance sensor is generated. On the contrary, according to the exemplary embodiment of the present disclosure, as illustrated in FIG. 10, a plurality of depth maps corresponding to all angles of view of the obtained image can be used. Therefore, even though the distance sensor having an angle of view which is smaller than the angle of view of the image sensor, the projection image having a wide angle of view corresponding to the wide angle of view of the image sensor may be generated.

This is because according to the exemplary embodiment of the present disclosure, the image obtaining pose is represented with respect to the reference coordinate system and the depth values obtained in the depth obtaining poses are also represented with respect to the reference coordinate system. Therefore, it is possible to determine a depth value of an image pixel obtained in a specific image obtaining pose by utilizing the reference coordinate system. This will be described below in more detail with reference to FIG. 15B.

Further, according to another exemplary embodiment, the depth value is represented with respect to the obtained coordinate system having an image obtaining pose as an original point to achieve the same effect, which will be described below with reference to FIG. 15C.

In the meantime, when a resolution of the image sensor is different from a resolution of the distance sensor, depth values corresponding to all the image pixels cannot be found. Therefore, in this case, depth values of image pixels to which depth values are not mapped may be easily estimated through interpolation by utilizing image pixels which are mapped to the depth values. As a result, there is no problem to embody the exemplary embodiment.

In the meantime, according to the exemplary embodiment of the present disclosure, even though the user is out of the image obtaining route so that there is no obtained image corresponding to the current pose of the user, a representative image set in the corresponding image obtaining pose corresponding to the current pose of the user can be used. Further, even though an angle of view of the depth map obtained from one corresponding depth obtaining pose corresponding to the current pose of the user is smaller than an angle of view of the representative image, a depth map having the same angle of view as that of the representative image may be provided using a depth map obtained in the plurality of different depth obtaining poses. Therefore, even though the user is out of the image obtaining route, a natural and realistic projection image may be produced.

Further, in order to generate a projection image using one image obtaining pose and a plurality of depth obtaining poses, all depth maps included in the angle of view of the representative image corresponding to a specific image obtaining pose needs to be found. In this case, depth-image associated information may be used. That is, a corresponding image obtaining pose corresponding to the current pose of the user is determined, and a plurality of depth maps included in the angle of view of the representative image obtained in the corresponding image obtaining pose is detected using depth-image associated information. The projection image may be generated using the plurality of detected depth maps and one representative image.

However, according to another exemplary embodiment, instead of detecting the depth map corresponding to the corresponding image obtaining pose whenever the corresponding image obtaining pose is determined, depth values corresponding to the corresponding image obtaining poses are grouped. Thereafter, the projection image may be generated using the grouped depth value. This will be described below with reference to FIG. 11.

FIG. 11 is a view illustrating an example of grouping depth values.

Referring to FIG. 11, an image obtaining pose $^{W}H_{C_i}$ for the image obtaining location Ci with respect to the original point W of the reference coordinate system is illustrated. Further, grouped depth values which match with respect to the image obtaining location is illustrated. As described above, when the depth values which are grouped corresponding to the image obtaining pose map, there is no need to calculate the depth value which newly corresponds thereto so that operation efficiency is increased.

However, when a serious positional error such as a ring closure situation is generated during the process using the grouped depth value, the image distortion is more significantly generated. This will be described with reference to FIGS. 12 and 13.

FIG. 12 is a view illustrating a ring closure situation.

FIG. 12 illustrates a ring closure situation. When the user visits the user poses which are almost close to each other two times with a long time interval, the obtained image and the obtained depth value are used together due to the contiguity of the distance in spite of different photographing conditions (illumination, an exposure time, and a focal distance of a lens) due to the long time interval and an accumulated pose estimating error during the two visits.

FIG. 13 is a view illustrating a depth value grouping distortion in a ring closure situation.

Referring to FIG. 13, depth values grouped for a j+100-th depth obtaining location Lj+100 is illustrated to be inclined at a predetermined angle due to a positional error in accordance with the ring closure situation. When the depth value is projected onto the obtained image obtained in Ci, a serious image distortion is generated.

FIG. 14 is a flowchart illustrating a method for generating a depth-image associated information according to an exemplary embodiment of the present disclosure.

In step S1410, a projection image generating apparatus estimates an image obtaining pose and a depth obtaining pose including an obtaining position and an obtaining angle of an obtained image and an obtained depth values in an actual 3D space, with respect to a reference coordinate system.

In step S1420, the projection image generating apparatus calculates a plurality of first depth value distances which is distances from the plurality of obtained depth values obtained in the depth obtaining pose to the depth obtaining pose.

For example, the projection image generating apparatus may calculate a first depth value distance $^{L_j}X_{jk}$ which is a distance from a k-th depth value to a j-th depth obtaining pose $^w\hat{H}_{L_j}$ for the k-th depth value obtained in a j-th depth obtaining pose $^w\hat{H}_{L_j}$.

In step S1430, the projection image generating apparatus converts the plurality of first depth value distances into a plurality of second depth value distances which are distances from a plurality of obtained depth values obtained in the depth obtaining pose to the image obtaining pose using the image obtaining pose and the depth obtaining pose.

More specifically, the projection image generating apparatus may calculate the second depth value distance by Equation 2.

$$^{C_i}X_{jk} = (^w\hat{H}_{C_i})^{-1} {}^w\hat{H}_{L_j} {}^{L_j}X_{jk} \quad \text{[Equation 2]}$$

Referring to Equation 2, the second depth value distance $^{C_i}X_{jk}$ may be calculated by mutually multiplying an inverse matrix $(^w\hat{H}_{C_i})^{-1}$ indicating an i-th image obtaining pose, a matrix $^w\hat{H}_{L_j}$ indicating a j-th depth obtaining pose, and a first depth value distance $^{L_j}X_{jk}$, respectively.

In step S1440, the projection image generating apparatus maps the plurality of obtaining depth values to a plurality of pixels included in the obtained image, using a camera matrix corresponding to the image sensor used to obtain an obtained image and a plurality of second depth value distances.

More specifically, the projection image generating apparatus may map the plurality of obtained depth values to the plurality of image pixels included in the obtained image, by Equation 3.

$$\begin{bmatrix} p \\ 1 \end{bmatrix} = K[I_3 \mid 0_{3\times 1}] \begin{bmatrix} {}^{C_i}X_{jk} \\ 1 \end{bmatrix} \quad \text{[Equation 3]}$$

Here, p indicates a position of a specific image pixel, K indicates a camera matrix, I3 indicates a 3 by 3 matrix configured by 1 and 0, and $0_{3\times 1}$ indicates a 3 by 1 zero matrix. A depth value corresponding to a specific image pixel position p is mapped through Equation 3. In the meantime, I3 is represented by Equation 4. The camera matrix is a matrix which rotates and moves the pixels included in an image disposed in an actual 3D space to represent the pixels with respect to a position of the image sensor.

$$I_3 = \begin{bmatrix} 1 & 0 & 0 \\ 0 & 1 & 0 \\ 0 & 0 & 1 \end{bmatrix} \quad \text{[Equation 4]}$$

As described above, when the mapping between the image pixel and the depth value are repeated for all image obtaining poses, a correspondence of a specific depth value and an angle of view of an image of an image obtaining pose may be understood.

In the meantime, when the resolution of the image sensor is higher than the resolution of the distance sensor, an unmapped pixel which does not have a corresponding depth value may be generated in the image pixels. In this case, the projection image generating apparatus may map an estimated depth value to an unmapped pixel using interpolation.

More specifically, when the resolution of the image sensor is higher than the resolution of the distance sensor, the projection image generating apparatus selects three or more initially associated depth values among initially associated depth values which are a plurality of obtained depth values mapped to the image pixels to configure a polygonal mesh (including a triangle mesh). The projection image generating apparatus calculates a number and a position of the plurality of unmapped pixels to be included in the polygonal mesh among the plurality of unmapped pixels which does not have corresponding obtained depth value, based on the resolution of the image sensor. Then, the projection image generating apparatus estimates the plurality of depth values corresponding to the plurality of unmapped pixels based on the number and the position of the plurality of calculated unmapped pixels and then maps the plurality of estimated depth values to the plurality of unmapped pixels.

For example, FIG. 25 is a view illustrating a polygonal mesh structure of a depth value according to an exemplary embodiment of the present disclosure. Referring to FIG. 25, a large number of triangle meshes are represented on the obtained image. Three vertexes which configure the triangle mesh are obtained depth values and represented by red color. The image pixels included in the triangle mesh do not have mapped depth values. In this case, the projection image generating apparatus calculates the number of image pixels included in the triangle mesh and the locations thereof to estimate the depth values corresponding to the image pixels using interpolation and map the depth values to the image pixels. In the meantime, the depth values which are mapped to the plurality of unmapped pixels may be referred to as additional associated depth values.

When the depth values are mapped to all pixels of the obtained image through this process, the projection image generating apparatus finally generates a depth-image associated information.

Further, the depth-image associated information generated as described above may be used to estimate the depth value included in the obtained image. For example, in step S1410, the projection image generating apparatus performs ray casting on the plurality of image obtaining poses to detect a plurality of associated depth values (initially associated depth values and additionally associated depth values) which is obtained depth values included in the obtained image obtained from the each of plurality of image obtaining poses with respect to the reference coordinate system.

In this case, the projection image generating apparatus may perform the ray casting on the each of plurality of image obtaining poses to detect a plurality of associated depth values.

More specifically, in the present disclosure, both the image obtaining pose $^w\hat{H}_{C_i}$ and the depth obtaining pose $^w\hat{H}_{L_j}$ in an i-th image obtaining location Ci and a j-th depth value obtaining location Lj are represented with respect to the reference coordinate system. Therefore, the projection image generating apparatus performs the ray casting on the depth obtaining pose $^w\hat{H}_{L_j}$ based on the depth-image associated information in the image obtaining pose $^w\hat{H}_{C_i}$, so that it is confirmed that a k-th depth value $^wH_{jk}$ in the depth obtaining pose $^wH_{L_j}$ is included in the angle of view of the obtained image obtained in the image obtaining pose $^wH_{C_i}$. In this case, k-th depth value $^wH_{jk}$ in the depth obtaining pose $^wH_{L_j}$ which is included in the angle of view of the obtained image obtained in the image obtaining pose $^wH_{C_i}$ may be detected as an associated depth value.

According to another exemplary embodiment, when the plurality of associated depth values is detected, the associated depth values may be detected only for a plurality of obtained depth values whose each of obtained times are within a predetermined time interval.

For example, when the associated depth values which are obtained depth values included in the obtained image are detected using both the obtained depth values obtained at time t1 and the obtained depth values obtained at t100 in the ring closure situation as illustrated in FIG. 12, the image distortion as illustrated in FIG. 13 may be generated. Therefore, the projection image generating apparatus may detect the associated depth values using only the obtained depth values at times t1 to t10.

In the related art, when the obtained depth value is obtained and stored, obtained time information is not separately stored and only the order of the plurality of obtained depth values is represented. Therefore, time intervals between the obtained depth values are not known. However, according to the present disclosure, when the plurality of obtained depth values is obtained, the obtained time is also stored together with the obtained depth values to be utilized to select the obtained depth values. Therefore, it is desirable that the image distortion due to the ring closure situation is minimized.

As described above, information of matching the plurality of associated depth values with respect to the obtained coordinate system and the plurality of pixels included in the obtained image is depth-image associated information. The depth-image associated information may be generated in each of the plurality of image obtaining poses.

According to another exemplary embodiment, the depth-image associated information may be information of matching the plurality of associated depth values with respect to the reference coordinate system and the plurality of pixels included in the obtained image.

In the meantime, in the exemplary embodiment of FIG. 14, the projection image generating apparatus performs an operation with respect to the reference coordinate system. However, the projection image generating apparatus may perform an operation with respect to an obtained coordinate system with respect to an original point of the image obtaining pose.

FIG. 15A is a view illustrating depth-image association according to an exemplary embodiment of the present disclosure.

Referring to FIG. 15, an i-th estimated image obtaining location $\hat{C}_i$ and a j-th estimated depth value obtaining location $\hat{L}_j$ are connected to a coordinate axis denoted by W through an arrow. This means that the image obtaining pose $^w\hat{H}_{C_i}$ in the image obtained location $\hat{C}_i$ and the depth obtaining pose $^w\hat{H}_{L_j}$ in the depth value obtaining location $\hat{L}_j$ are estimated with respect to the reference coordinate system.

Further, a coordinate axis denoted by $\hat{L}_j$ is connected to a point indicating a depth value through an arrow and is denoted by $^{L_j}X_j$, which represents a first depth value distance $^{L_j}X_j$ which is a distance from a k-th depth value obtained in the j-th depth obtaining pose $^w\hat{H}_{L_j}$ to the j-th depth obtaining pose $^w\hat{H}_{L_j}$.

Further, at an upper portion of FIG. 15A, an image plane is mapped to the image obtaining location $\hat{C}$. An original point of the coordinate axis denoted by $\hat{C}_i$ indicates a center point of the image sensor (camera). The image plane indicates a 2D image plane which is formed when the 3D space is watched from a CMOS sensor mounted in the image sensor.

In this case, the distance from the image obtaining point $\hat{C}_i$ to the depth value is a second depth value distance $^{C_i}X_{jk}$. An image pixel p is represented at a point where a line linearly connecting from the image obtaining location $\hat{C}_i$ to the depth value and the image plane intersect each other. This means that the pixel p is mutually mapped to the second depth value distance $^{C_i}X_{jk}$.

However, in case of some depth value, the line linearly connecting from the image obtaining location $\hat{C}_i$ the depth value is out of the image plane so that there is no intersecting point. In this case, an unmapped pixel which does not have a corresponding depth value is generated.

FIG. 15B is a view illustrating depth-image association according to another exemplary embodiment of the present disclosure.

In FIG. 15B, an i-th estimated image obtaining location and $\hat{C}_i$ and j−1-th, j-th, and j+1-th estimated depth value obtaining locations $\hat{L}_{j-1}$, $\hat{L}_j$, $\hat{L}_{j+1}$ are connected to a coordinate axis denoted by W through an arrow. This means that the image obtaining pose in the image obtained location $\hat{C}_i$ and the depth obtaining poses in the depth value obtaining locations $\hat{L}_{j-1}$, $\hat{L}_j$, $\hat{L}_{j+1}$ are estimated with respect to the reference coordinate system.

Further, points which are scattered and distributed in the lower portion of FIG. 15B indicate obtained depth values obtained in each of the depth obtaining poses. The coordinate axis denoted by W is connected with the points by an arrow, which means that the depth value is represented with respect to the reference coordinate system. However, in another exemplary embodiment, the obtained depth value may be represented with respect to the obtained coordinate system with the image obtaining location $\hat{C}_i$ as an original point.

Further, at the upper portion of FIG. 15B, a representative image is mapped to the image obtaining location $\hat{C}$, which indicates that the representative image is set as an image which is representative of an obtained coordinate system having the image obtaining location $\hat{C}_i$ as an original point.

That is, according to the depth-image association of FIG. 15B, the image obtaining pose and the depth obtaining pose are estimated with respect to the reference coordinate system. One representative image among a plurality of obtained images obtained from the image obtaining pose is selected as an image which is representative of the obtained coordinate system having the image obtaining pose as an original point to be associated with the image obtaining pose. The obtained depth value is estimated with respect to the reference coordinate system.

In the meantime, when an angle of view of the image sensor in the exemplary embodiment of FIG. 15B is larger than the angle of view of the distance sensor and all the depth maps obtained from the depth obtaining poses in the depth value obtaining locations $\hat{L}_{j-1}$, $\hat{L}_j$, $\hat{L}_{j+1}$ are included in an angle of view of the representative image associated with the obtained coordinate system of the image obtaining location $\hat{C}$, the projection image generating apparatus may generate the projection image using one representative image associated with the obtained coordinate system of the image obtaining location $\hat{C}_i$ and the plurality of depth maps obtained in the depth obtaining poses in the depth value obtaining locations $\hat{L}_{j-1}$, $\hat{L}_j$, $\hat{L}_{j+1}$.

FIG. 15C is a view illustrating a depth-image association according to still another exemplary embodiment of the present disclosure.

In FIG. 15C, the i-th estimated image obtaining location $\hat{C}_i$ is connected with the coordinate axis denoted by W by an arrow. This means that the image obtaining pose in the image obtaining location $\hat{C}_i$ is estimated with respect to the reference coordinate system.

Further, the j−1-th, j-th, and j+1-th estimated depth value obtaining locations $\hat{L}_{j-1}$, $\hat{L}_j$, $\hat{L}_{j+1}$ are connected with the coordinate axis denoted by the image obtaining location $\hat{C}_i$ by an arrow. This means that the depth obtaining poses of the j−1-th, j-th, and j+1-th estimated depth value obtaining locations $\hat{L}_{j-1}$, $\hat{L}_j$, $\hat{L}_{j+1}$ are estimated with respect to the obtained coordinate system having the image obtaining location $\hat{C}_i$ as an original point.

Further, in FIG. 15C, the coordinate axis denoted by the image obtaining location $\hat{C}_i$ is connected with one of the plurality of points indicating the depth values in the lower portion by an arrow, which means that the obtained depth value is represented with respect to the obtained coordinate system having the image obtaining location $\hat{C}_i$ as an original point. However, in another exemplary embodiment, the obtained depth value may be represented with respect to the reference coordinate system.

Further, at the upper portion of FIG. 15C, a representative image is mapped to the image obtaining location $\hat{C}_i$, which indicates that the representative image is set as an image which is representative of an obtained coordinate system having the image obtaining location $\hat{C}_i$ as an original point.

That is, according to the depth-image association of FIG. 15C, the image obtaining pose is estimated with respect to the reference coordinate system and the depth obtaining pose is estimated with respect to the obtained coordinate system having an image obtaining pose as an original point. One representative image among a plurality of obtained images obtained from the image obtaining pose is selected as an image which is representative of the obtained coordinate system having the image obtaining pose as an original point to be associated with the image obtaining pose. The obtained depth value is estimated with respect to the obtained coordinate system having the image obtaining pose as an original point.

A projection image generating method in accordance with FIG. 15C will be described with reference to FIG. 16.

FIG. 16 is a flowchart illustrating a projection image generating method according to another exemplary embodiment of the present disclosure.

In step S1610, a projection image generating apparatus estimates a plurality of image obtaining poses corresponding to a plurality of obtained images obtained in an actual 3D space with respect to a reference coordinate system and estimates a plurality of depth obtaining poses corresponding to a plurality of obtained depth values with respect to an obtained coordinate system having each of a plurality of image obtaining poses as an original point.

In step S1620, the projection image generating apparatus obtains a user pose including the position and the angle of the user in a virtual 3D space corresponding to an actual 3D space with respect to the reference coordinate system.

In step S1630, the projection image generating apparatus generates a projection image obtained by projecting the plurality of obtained depth values onto at least one of the plurality of obtained images based on a corresponding image obtaining pose and at least one corresponding depth obtaining pose corresponding to the user pose.

In this case, the projection image generating apparatus may project only an obtained depth value obtained within a predetermined time from a time where the plurality of obtained images which is used to generate a projection image among the plurality of obtained depth values is obtained into a representative image to generate a projection image, in order to minimize distortion of the projection image caused when the ring closure situation is generated.

Further, the projection image generating apparatus generates a projection image using a representative image which is associated with a corresponding depth obtaining pose. When the representative image which is associated with the corresponding depth obtaining pose is selected, the depth-image associated information may be used.

For example, after detecting an overlapping region of the obtained image and a field of view of a user through the depth-image associated information, the projection image generating apparatus may set an obtained image having the largest overlapping region as a representative image. The exemplary embodiment described above may be easily implemented by a method for selecting an image associated with an image obtaining pose which is the closest to the user pose as a representative image.

FIG. 17 is a flowchart illustrating a projection image generating method when a field of lost view is present according to an exemplary embodiment of the present disclosure, FIG. 18 is a view illustrating an environment where an angle of view of an image sensor includes a field of view of a user, and FIG. 19 is a view illustrating an environment where an angle of view of an image sensor does not include a field of view of a user;

An exemplary embodiment of FIG. 17 is an exemplary embodiment which limits step S130 of FIG. 1 and step S1630 of FIG. 16 and is performed after step S110 and step S120 of the exemplary embodiment of FIG. 1. Further, the exemplary embodiment of FIG. 17 is performed after step S1610 and step S1620 of FIG. 16.

In step S1710, the projection image generating apparatus determines whether a lost viewing field region which is not included in the representative image is present in a virtual 3D space corresponding to the viewing angle of the user.

Referring to FIG. 18, the angle of view of the image sensor in the i-th image obtaining location Ci includes all the fields of view of the user in the location u of the user so that there is no lost viewing field region.

However, referring to FIG. 19, a gray quadrangular obstacle is present below an i-th image obtaining location Ci and the location u of the user, so that the angle of view of the image sensor located in the i-th image obtaining location Ci is restricted. Therefore, the limit of the field of view of the image sensor is narrower than the limit of the field of view of the user so that a lost viewing field region denoted by x is generated. When the user watches the lost viewing field region in the virtual 3D space, the representative image does not have a pixel corresponding to the lost viewing field region, so that the representative image may be represented by black or white.

Meanwhile, according to the obtained coordinate based projection image generating method of the related art, it cannot be appreciated that which obtained image is included in the field of view of the user so that the projection image is generated such that a pixel corresponding to the lost viewing field region is represented by black or white.

However, according to the exemplary embodiment of the present disclosure, it may be confirmed that which pixel of the obtained image is included in the field of view of the user via a depth value through the depth-image associated information. By doing this, it is confirmed that which obtained image needs to be within the field of view of the user so that the projection image in which the pixel corresponding to the lost viewing field region is represented to have the same color as in the actual 3D space may be generated. That is, according to an exemplary embodiment of the present disclosure, as illustrated in FIG. 19, even though an obstacle is present or the image obtaining pose is different from the user pose, a natural projection image corresponding to an arbitrary field of view of the user in the corresponding location may be generated.

In step S1720, when it is determined that the lost viewing field region is present, the projection image generating apparatus selects a supplementary image among the plurality of obtained images based on the depth-image associated information which is information which matches to the plurality of obtained depth values corresponding to the plurality of pixels included in the plurality of obtained images.

In this case, specific description for an operating of selecting a supplementary image will be described below with reference to FIG. 20.

In step S1730, the projection image generating apparatus mutually combines the supplementary image and the representative image to generate a combined image.

In this case, the projection image generating apparatus mutually combines the supplementary image with the same weight as the representative image or combines the supplementary image with a weight which is lower than that of the representative image to generate a combined image.

In step S1742, the projection image generating apparatus generates a projection image where the plurality of obtained depth values is projected into the combined image.

In step S1744, when it is determined that the lost viewing field region is not present in step S1742, the projection image generating apparatus generates a projection image where the plurality of obtained depth values is projected into the combined representative image.

FIG. 20 is a flowchart illustrating a supplementary image selecting method according to an exemplary embodiment of the present disclosure.

In step S2010, the projection image generating apparatus detects a plurality of depth values of a user's field of view which are depth values included in the user's field of view with respect to the user pose.

As described above, the projection image generating apparatus performs the ray casting on the user pose to detect a plurality of depth values of user's fields of view.

In step S2020, the projection image generating apparatus detects a plurality of depth values of a field of lost view which is depth values corresponding to the lost viewing field region among the plurality of depth values of user's field of view.

For example, when the user watches the 3D space while making one rotation in a specific user pose, there is a plurality of depth values of the user's field of view corresponding to 360 degrees. However, among these, there may be a lost viewing field region at a specific angle, and the projection image generating apparatus detects the depth value corresponding to the lost viewing field region as a depth value of a field of lost view.

In step S2030, the projection image generating apparatus detects a plurality of lost pixels corresponding to the plurality of depth values of the field of lost view based on the depth-image associated information.

For example, when the depth-image associated information is used, the projection image generating apparatus understands which pixel corresponds to each of the plurality of depth values of the field of lost view. Therefore, the pixels corresponding to the each of plurality of depth values of the field of view are detected as a lost pixel.

In step S2040, the projection image generating apparatus selects a supplementary image which is an obtained image including a plurality of lost pixels among the plurality of obtaining images based on the plurality of detected lost pixels.

FIG. 21 is a view illustrating a difference between the present disclosure and the related art in accordance with movement of a user.

In FIG. 21, an image obtaining route is represented by A-B-C-D . . . X-Y-Z. As described above, in the related art, only when the user follows the route where the image is obtained as it is, the projection image is provided. However, according to the exemplary embodiment, even when the user is out of the image obtaining route to move from C to X, a natural projection image may be provided.

FIG. 22 is a view illustrating a parameter based depth value mesh structure according to an exemplary embodiment of the present disclosure.

FIG. 22 illustrates that a depth map is configured by an obtained depth value having a parameter based mesh structure. A mesh at the left side is a mesh structure which is approximated by a parameterized pattern which is defined by a box with an inclined ceiling. The center indicates a mesh structure which is approximated by the bounding box which includes all the depth values. The right side indicates a geographical mesh structure which is approximated to include a larger number of depth values while reducing the number of meshes. When the depth values of the mesh structure as described above are used, even though the depth-image association is not performed on all image pixels, the projection image may be generated in the unit of mesh.

FIG. 23 is a view illustrating a projection image generating apparatus according to an exemplary embodiment of the present disclosure.

Referring to FIG. 23, the projection image generating apparatus according to an exemplary embodiment of the present disclosure includes a pose estimating unit 2310, a user pose obtaining unit 2320, and an image generating unit 2330.

The data pose estimating unit 2310 estimates a plurality of image obtaining poses and a plurality of depth obtaining poses including obtaining positions and obtaining angles of a plurality of obtained images and a plurality of obtained depth values in an actual 3D space, with respect to a reference coordinate system.

According to another exemplary embodiment, the data pose estimating unit 2310 estimates the image obtaining pose with respect to a reference coordinate system and estimates the depth obtaining pose with respect to an obtained coordinate system having an image obtaining pose as an original point.

Desirably, the projection image generating apparatus according to an exemplary embodiment of the present disclosure may further include a storing unit (not illustrated) which receives a plurality of obtained images, obtaining time information when the plurality of obtained images is obtained, a plurality of obtained depth values, obtained time information when the plurality of obtained depth values is obtained, a plurality of image obtaining poses corresponding to the plurality of obtained images, a depth obtaining pose corresponding to the plurality of obtained depth values, and environment sensing information such as inertia change information, sign observation information, and light wave meter information from a plurality of sensors to store the information.

In this case, a sensor which senses the environment sensing information may be an integrated sensor in which an image sensor and a distance sensor are combined as illustrated in FIG. 3 or an integrated sensor where the other sensors are combined therein. In the integrated sensor of FIG. 3, the image sensor and the distance sensor are rigidly fastened. In this case, the relative pose between two sensors may be given in advance as a constant value. Further, the environment sensing information may be information obtained by an integrated sensor mounted in a robot or an integrated circuit worn on a shoulder of the user in a stopped state or a moving state while moving between the indoor and the outdoor.

The data pose estimating unit 2310 reads the environment sensing information stored in the storing unit to estimate all the image obtaining poses and the depth obtaining poses with respect to the reference coordinate system. However, according to another exemplary embodiment, the data pose estimating unit 2310 may estimate the depth obtaining pose with respect to the obtained coordinate system and then estimate the depth obtaining pose with respect to the reference coordinate system using a relative pose between the depth obtaining pose and the image obtaining pose.

Further, the data pose estimating unit 2310 may set a representative image which is representative of the obtained coordinate system having the image obtaining pose, among the plurality of obtained images obtained in the image obtaining pose, as an original point to be associated with the obtained coordinate system and then stored in the storing unit. Therefore, when the user enters the obtained coordinate system of the specific image obtaining pose in a virtual 3D space, even though the user moves within a distance in a predetermined threshold value in the corresponding obtained coordinate system, only a representative image which is representative of the obtained coordinate system may be displayed to the user.

The user pose obtaining unit 2320 obtains a user pose including the position and the angle of the user in a virtual 3D space corresponding to an actual 3D space with respect to the reference coordinate system.

Desirably, the projection image generating apparatus according to an exemplary embodiment of the present disclosure may further include a user input unit (not illustrated) which moves the user in a virtual 3D space and sets a viewing angle of the user.

The user input unit may be a keyboard or a joystick or may be an input unit based on an angular velocity sensor, an acceleration sensor, or a geomagnetic sensor provided in a head mount display (HMD), or an optical flow of a camera image.

The image generating unit 2330 generates a projection image obtained by projecting the plurality of obtained depth values into at least one of the plurality of obtained images based on a corresponding image obtaining pose and at least one corresponding depth obtaining pose corresponding to the user pose.

More specifically, the image generating unit 2330 projects a plurality of depth values obtained in the plurality of corresponding depth obtaining poses into one representative image (or a combined image) to generate a projection image.

A specific configuration of the image generating unit 2330 will be described below with reference to FIG. 24.

Desirably, the projection image generating apparatus according to an exemplary embodiment of the present disclosure may further include an image management unit (not illustrated) which samples an image in accordance with a reference of a distance, a moving time, or a shape characteristic of the obtained image among the plurality of obtaining images to reduce the number of obtained images which is used to generate the projection image. That is, the image management unit may perform post processing on an obtained image which has a dynamic portion among the obtained images stored in the storing unit or personal information such as a face. Further, when the plurality of obtained images is obtained in the different photographing conditions (illumination, exposure time, or a focal distance of a lens) at a location where the ring closure situation, the image management unit may perform correction on the obtained image to minimize the difference thereof.

In the meantime, the image management unit stores the obtained image on which the processing is completed in the storing unit again, so that the number of obtained images which is used to generate a projection image and difference between the obtained images may be reduced. Further, when the difference of the photographing conditions between obtained images is equal to or larger than a predetermined threshold value, the image management unit issues a warning and then performs correction to reduce the difference between the images.

Desirably, the projection image generating apparatus according to an exemplary embodiment of the present disclosure may further include a depth value management unit (not illustrated) which removes a noise included in the obtained depth values obtained through the distance sensor. In this case, the operation of removing a noise included in the obtained depth value may be performed by referring to "a suburb space feature information extracting method" of Korea Patent Application No. 10-2015-0062890 (filed on May 6, 2015).

Differently from the obtained image, the obtained depth value may include lots of noises for glass, a mirror, or a reflective material. Further, one object is observed several times due to a wide detecting distance of the distance sensor or a large number of depth values are focused in a specific region. The noise or imbalanced depth value distribution may significantly hinder a realism of the projection image in the future. Therefore, the depth value management unit may perform an operation of removing the noise included in the obtained depth value stored in the storing unit in advance.

According to another exemplary embodiment, the image generating unit 2330 may generate a projection image using an obtained image and an obtained depth value which go through the image management unit and the depth value management unit.

FIG. 24 is a view illustrating an image generating unit according to an exemplary embodiment of the present disclosure.

Referring to FIG. 24, the image generating unit 2330 according to an exemplary embodiment of the present invention includes a user's field of view determining unit 2332, a supplementary image selecting unit 2334, a combined image generating unit 2336, and a projection image generating unit 2338. In another exemplary embodiment, the supplementary image selecting unit 2334 and the combined image generating unit 2336 may be omitted.

A user's field of view determining unit 2332 determines whether a lost viewing field region which is not included in the representative image is present in a virtual 3D space corresponding to the viewing angle of the user in the user pose.

In another exemplary embodiment, the user's field of view determining unit 2332 may determine whether the user pose is equal to or different from the image obtaining pose or the depth obtaining pose.

In another exemplary embodiment, when a predetermined threshold value or more of a field of view of the user in a user pose is included in an angle of view of the obtained image obtained in the image obtaining pose, it may be determined that the user pose is equal to the image obtaining pose. Otherwise, it may be determined that the user pose is different from the image obtaining pose. For example, when the angle of view of the obtained image obtained in the image obtaining pose and the field of view of the user in the user pose overlap 90% or more, it may be determined that the user pose and the image obtaining pose are equal to each other.

When it is determined that the lost viewing field region is present, the supplementary image selecting unit 2334 selects a supplementary image among the plurality of obtained images based on the depth-image associated information which is information which matches to the plurality of obtained depth values corresponding to the plurality of pixels included in the plurality of obtained images.

The combined image generating unit 2336 mutually combines the supplementary image with the representative image to generate a combined image.

In this case, the combined image generating unit 2336 mutually combines the supplementary image with the same weight as the representative image or mutually combines the supplementary image with a weight which is lower than that of the representative image to generate a combined image.

For example, the combined image generating unit 2336 combines the supplementary image whose transparency is increased with the representative image in the form of layer to generate a combined image in which a weight of the supplementary image is low.

The projection image generating unit 2338 generates a projection image where the plurality of obtained depth values is projected in the combined image.

As described above, the projection image generating unit 2338 may generate a projection image using a combined image or generate a projection image using only the representative image. In this case, in accordance with whether the user pose is equal to a corresponding image obtaining pose corresponding to the user pose, the following operations will be performed.

First, when the user pose is equal to the corresponding image obtaining pose and an angle of view of the obtained image obtained in the corresponding image obtaining pose is equal to an angle of view of a depth map configured by a plurality of obtained depth values obtained in the corresponding depth obtaining pose (same pose and same angle of view), the projection image generating unit 2338 generates a projection image using the obtained image and the obtained depth value. In this case, the projection image generating unit 2338 selects one representative image among a plurality of obtained images obtained in the corresponding image obtaining pose and projects the obtained depth value into the selected representative image to generate a projection image.

Second, even though the user pose is equal to the corresponding image obtaining pose, when the angle of view of the obtained image obtained in the corresponding image obtaining pose is larger than the angle of view of a depth map obtained in the corresponding depth obtaining pose (same pose and different angle of view), the projection image generating unit 2338 projects a plurality of depth maps obtained in the plurality of corresponding depth obtaining poses into one representative image which is associated with the obtained coordinate system of one corresponding image obtaining pose to generate a projection image.

Third, when the user pose is different from the corresponding image obtaining pose, the projection image generating unit 2338 uses a combined image obtained by combining one representative image which is associated with the obtained coordinate system of one corresponding image obtaining pose and a supplementary image and a plurality of depth maps obtained in a plurality of corresponding depth obtaining poses to generate a projection image.

As described above, when a weight of the representative image is equal to a weight of the supplementary image at the time of generating a combined image, a realism of the projection image is significantly lowered due to several pixels or more of position estimating error which is inevitably generated because one point in an actual 3D space is represented using a plurality of obtained images. At the time of generating the combined image, the weight of the representative image should be set to be higher than the weight of the supplementary image. However, when the weight of the representative image is 99.9 and the weight of the supplementary image is 0.1, that is, the weight of the supplementary image is very small, the influence of the corresponding supplementary image to the realism of the projection image is very small. Therefore, the corresponding supplementary image may not be used to generate the combined image.

In the meantime, the representative image which is associated with the obtained coordinate system of the image obtaining pose may be set by a method of detecting an overlapping region of the obtained image and the user's field of view through depth-image associated information and then setting an obtained image having the largest overlapping region as a representative image or a method of setting an obtained image which is the closest to the image obtaining pose as a representative image. In this case, the distance from the image obtaining pose to the obtained image is a value calculated based on Euclidean matrix. For example, the absolute difference or a second norm (2-norm) may be used.

The present invention is used an indoor room, home, shopping malls, hotels, terminals, or airports in an indoor environment. Further, the present invention is used to preserve cultural heritages or city-geometrical information in an outdoor environment. Therefore, the present invention is used for an apartment complex and a school campus in the indoor and outdoor environments. Therefore, the present invention is applied to the above-mentioned location, to produce a 3D virtual map.

The 3D map information serves as a platform to produce various services. When the 3D map information is utilized, a real estate associated service, a facility promotion service, a game contents producing service, a historic site-tourist spot actual experience service, a 020 service which associates object information in the map may be provided.

Further, core feature points are extracted from the 3D map information which is manufactured in advance and stored in a database. When the user obtains the data using a camera or inertial sensor information in an actual space, the feature point of the database is compared with the feature point which is provided by the user to immediately find the location of the user. By doing this, a projection image may be generated by considering a display device of a user device as a field of view of the user. Further, continuous projection images are provided in accordance with the manipulation of the device by the user, so that the user may experience the 3D map through the display.

For example, the user may obtain an ambience of a store or detailed information of a specific article without entering the store. Further, the present invention may also be used for disaster safety management. For example, in a dangerous region such as an atomic power plant where people urgently go and out, data is briefly obtained through a robot and a virtual space is built using the present invention, and then infiltrator sufficiently experience the space through HMD, so that emergency response may be provided for the disaster.

For now, the present invention has been described with reference to the exemplary embodiments. It is understood to those skilled in the art that the present invention may be implemented as a modified form without departing from an essential characteristic of the present invention. Therefore, the disclosed exemplary embodiments may be considered by way of illustration rather than limitation. The scope of the present invention is presented not in the above description but in the claims and it may be interpreted that all differences within an equivalent range thereto may be included in the present invention.

The invention claimed is:

1. A projection image generating method, comprising:
   estimating a plurality of image obtaining poses and a plurality of depth obtaining poses including obtaining positions and obtaining angles of a plurality of obtained images and a plurality of obtained depth values obtained in an actual 3D space, respectively, with respect to a reference coordinate system;
   obtaining a user pose including a location and an angle of the user in a virtual 3D space corresponding to the actual 3D space with respect to the reference coordinate system; and
   generating a projection image obtained by projecting the plurality of obtained depth values into at least one of the plurality of obtained images, based on the corresponding image obtaining pose and at least one corresponding depth obtaining pose corresponding to the user pose;
   wherein at least one of the plurality of obtained images used to generate the projection image is an obtained image obtained in the corresponding image obtaining pose and a representative image which is set to be an image representative of an obtained coordinate system which is a coordinates system having the corresponding image obtaining pose as an original point;
   wherein the plurality of obtained depth values used to generate the projection image is a plurality of depth values obtained in the corresponding depth obtaining pose and includes a plurality of corresponding depth values which are depth values included in an angle of view of the representative image among a plurality of depth values with respect to an original point of the reference coordinate system or a plurality of depth values with respect to an original point of the obtained coordinate system;
   wherein when the user pose is equal to the corresponding image obtaining pose and the angle of view of the obtained image obtained in the corresponding image obtaining pose is larger than an angle of view of a depth map configured by the plurality of obtained depth values obtained in the corresponding depth obtaining pose; and
   wherein the generating of a projection image is performed using the plurality of depth maps obtained from the plurality of corresponding depth obtaining poses within a predetermined distance from the corresponding image obtaining pose in which the representative image is obtained and the representative image.

2. The method according to claim 1, wherein in the generating of a projection image, the projection image is generated by projecting the plurality of corresponding depth values into a plurality of corresponding pixels which is pixels included in the representative image corresponding to each of the plurality of depth values.

3. The method according to claim 1, wherein when at least one of obtaining position and obtaining angle of the user pose is different from at least one of obtaining positon and obtaining angle of the corresponding image obtaining pose and a region on the virtual 3D space corresponding to a viewing angle of the user in the user pose has a lost viewing field region which is not included in the representative image,
   the generating of a projection image includes generating the projection image using a supplementary image which is an obtained image including a plurality of lost pixels which are pixels corresponding to the lost viewing field region among the plurality of obtained images excluding the representative image.

4. The method according to claim 3, wherein the generating of the projection image using the supplementary image and the representative image includes determining whether there is the lost viewing field region;
   when it is determined that there is the lost viewing field region, selecting the supplementary image from the plurality of obtained images based on depth-image associated information to which the plurality of obtained depth values corresponding to the plurality of pixels included in the plurality of obtained images is matched;
   generating a combined image by mutually combining the supplementary image with a lower weight than the representative image; and
   generating a projection image obtained by projecting the plurality of obtained depth values into the combined image.

5. The method according to claim 4, wherein the selecting of the supplementary image from the plurality of obtained images includes detecting a plurality of depth values of user's field of view which is a depth value included in a viewing angle of the user by performing ray casting on the user pose;
   detecting a plurality of depth values of fields of lost view which is a depth value corresponding to the lost viewing field region among the plurality of depth values of user's field of view;
   detecting the plurality of lost pixels corresponding to the plurality of depth values of the field of lost view based on the depth-image associated information; and
   selecting the supplementary image from the plurality of obtained images, based on the plurality of detected lost pixels.

6. The method according to claim 4, wherein the depth-image associated information is calculated by calculating a plurality of first depth value distances which is a distance from the plurality of obtained depth values obtained in the depth obtaining pose to the depth obtaining pose;

converting the first depth value distance into a plurality of second depth value distances which is a distance from each of the plurality of obtained depth values obtained in the depth obtaining pose to the image obtaining pose, using the image obtaining pose and the depth obtaining pose; and mapping the plurality of obtained depth values to the plurality of pixels included in the obtained image, using a camera matrix corresponding to an image sensor used to obtain the obtained image and the plurality of second depth value distances.

7. The method according to claim 6, wherein the calculating of a plurality of first depth value distances which is a distance from the plurality of obtained depth values obtained in the depth obtaining pose to the depth obtaining poses is performed only using the plurality of obtained depth values whose each of obtaining time of the plurality of obtained depth values is within a predetermined time interval.

8. The method according to claim 1, wherein when the user pose is equal to the corresponding image obtaining pose and the angle of view of the obtained image obtained in the corresponding image obtaining pose is larger than an angle of view of a depth map configured by the plurality of obtained depth values obtained in the corresponding depth obtaining pose, the generating of a projection image is performed using a grouping depth map which is generated by previously grouping the plurality of depth maps obtained from the plurality of corresponding depth obtaining poses within a predetermined distance from the corresponding image obtaining pose in which the representative image is obtained and the representative image.

9. The method according to claim 1, wherein a depth map configured by the plurality of obtained depth values is configured by an obtained depth value of a mesh structure based on a predetermined parameter.

10. The method according to claim 1, wherein the generating of a projection image is performed only using the obtained depth value obtained within a predetermined time from a time when each of the plurality of obtained images to be used to generate the projection image is obtained among the plurality of obtained depth values.

11. The method according to claim 1, wherein the obtained angle included in each of the plurality of image obtaining pose is an omni-directional angle when the obtained image included in each of the plurality of image obtaining poses is obtained by an omni-directional camera.

12. A projection image generating method, comprising:
estimating a plurality of image obtaining poses including an obtaining location and an obtaining angle of the plurality of obtained images obtained in an actual 3D space with respect to a reference coordinate system and estimating a plurality of depth obtaining poses corresponding to a plurality of obtained depth values with respect to an obtained coordinate system having each of the plurality of image obtaining poses as an original point;

obtaining a user pose including a location and an angle of the user in a virtual 3D space corresponding to the actual 3D space with respect to the reference coordinate system; and generating a projection image obtained by projecting the plurality of obtained depth values into at least one of the plurality of obtained images, based on the corresponding image obtaining pose and at least one corresponding depth obtaining pose corresponding to the user pose;

wherein at least one of the plurality of obtained images used to generate the projection image is an obtained image obtained in the corresponding image obtaining pose and a representative image which is set to be an image representative of an obtained coordinate system which is a coordinates system having the corresponding image obtaining pose as an original point;

wherein the plurality of obtained depth values used to generate the projection image is a plurality of depth values obtained in the corresponding depth obtaining pose and includes a plurality of corresponding depth values which are depth values included in an angle of view of the representative image among a plurality of depth values with respect to an original point of the obtained coordinate system;

wherein when the user pose is equal to the corresponding image obtaining pose and the angle of view of the obtained image obtained in the corresponding image obtaining pose is larger than an angle of view of a depth map configured by the plurality of obtained depth values obtained in the corresponding depth obtaining pose; and wherein the generating of a projection image is performed using the plurality of depth maps obtained from the plurality of corresponding depth obtaining poses within a predetermined distance from the corresponding image obtaining pose in which the representative image is obtained and the representative image.

13. A projection image generating apparatus, comprising:
a computer processor;
a data storage device; and
a computer readable code stored in the data storage device and executable by the computer processor, the computer readable code defining functional units which include:
a data pose estimating unit which estimates a plurality of image obtaining poses and a plurality of depth obtaining poses including obtaining positions and obtaining angles of a plurality of obtained images and a plurality of obtained depth values obtained in an actual 3D space, respectively, with respect to a reference coordinate system;
a user pose obtaining unit which obtains a user pose including a location and an angle of the user in a virtual 3D space corresponding to the actual 3D space with respect to the reference coordinate system; and
an image generating unit which generates a projection image obtained by projecting the plurality of obtained depth values into at least one of the plurality of obtained images, based on the corresponding image obtaining pose and at least one corresponding depth obtaining pose corresponding to the user pose;
wherein at least one of the plurality of obtained images used to generate the projection image is a representative image which is set to be an image representative of an obtained coordinate system which is a coordinates system having the corresponding image obtaining pose as an original point, as an obtained image obtained in the corresponding image obtaining pose;
wherein the plurality of obtained depth values used to generate the projection image includes a plurality of corresponding depth values which are depth values included in an angle of view of the representative image among a plurality of depth values with respect to an original point of the reference coordinate system or a plurality of depth values with respect to an original point of the obtained coordinate system as a plurality of depth values obtained in the corresponding depth obtaining pose;

wherein when the user pose is equal to the corresponding image obtaining pose and the angle of view of the obtained image obtained in the corresponding image obtaining pose is larger than an angle of view of a depth map configured by the plurality of obtained depth values obtained in the corresponding depth obtaining pose; and wherein the image generating unit generates the projection image using the plurality of depth maps obtained from the plurality of corresponding depth obtaining poses within a predetermined distance from the corresponding image obtaining pose in which the representative image is obtained and the representative image.

14. The apparatus according to claim 13, wherein when at least one of obtaining positon and obtaining angle of the corresponding image obtaining pose is different from at least one of obtaining position and obtaining angle of the user pose and a region on the virtual 3D space corresponding to a viewing angle of the user in the user pose has a lost viewing field region which is not included in the representative image, the image generating unit generates the projection image using a supplementary image which is an obtained image including a plurality of lost pixels which are pixels corresponding to the lost viewing field region among the plurality of obtained images excluding the representative image.

15. The apparatus according to claim 14, wherein the image generating unit includes: a user's field of view determining unit which determines whether there is the lost viewing field region;

a supplementary image selecting unit which, when it is determined that there is the lost viewing field region, selects the supplementary image from the plurality of obtained images based on depth-image associated information to which the plurality of obtained depth values corresponding to the plurality of pixels included in the plurality of obtained images is matched;

a combined image generating unit which generates a combined image by mutually combining the supplementary image with a lower weight than the representative image; and a projection image generating unit which generates a projection image obtained by projecting the plurality of obtained depth values into the combined image.

16. A projection image generating apparatus, comprising:
a computer processor;
a data storage device; and
a computer readable code stored in the data storage device and executable by the computer processor, the computer readable code defining functional units which include:

a data pose estimating unit which estimates a plurality of image obtaining poses including an obtaining location and an obtaining angle of the plurality of obtained images obtained in an actual 3D space with respect to the reference coordinate system and estimates a plurality of depth obtaining poses corresponding to a plurality of obtained depth values with respect to an obtained coordinate system having each of the plurality of image obtaining poses as an original point;

a user pose obtaining unit which obtains a user pose including a location and an angle of the user in a virtual 3D space corresponding to the actual 3D space with respect to the reference coordinate system; and an image generating unit which generates a projection image obtained by projecting the plurality of obtained depth values into at least one of the plurality of obtained images, based on the corresponding image obtaining pose and at least one corresponding depth obtaining pose;

wherein at least one of the plurality of obtained images used to generate the projection image is an obtained image obtained in the corresponding image obtaining pose and a representative image which is set to be an image representative of an obtained coordinate system which is a coordinates system having the corresponding image obtaining pose as an original point;

wherein the plurality of obtained depth values used to generate the projection image is a plurality of depth values obtained in the corresponding depth obtaining pose and includes a plurality of corresponding depth values which are depth values included in an angle of view of the representative image among a plurality of depth values with respect to an original point of the obtained coordinate system;

wherein when the user pose is equal to the corresponding image obtaining pose and the angle of view of the obtained image obtained in the corresponding image obtaining pose is larger than an angle of view of a depth map configured by the plurality of obtained depth values obtained in the corresponding depth obtaining pose; and wherein the image generating unit generates the projection image using the plurality of depth maps obtained from the plurality of corresponding depth obtaining poses within a predetermined distance from the corresponding image obtaining pose in which the representative image is obtained and the representative image.

* * * * *